US012475368B2

(12) United States Patent
Ullah et al.

(10) Patent No.: US 12,475,368 B2
(45) Date of Patent: Nov. 18, 2025

(54) MACHINE UNLEARNING AND RETRAINING OF A MACHINE LEARNING MODEL BASED ON A MODIFIED TRAINING DATASET

(71) Applicant: ADOBE INC., San Jose, CA (US)

(72) Inventors: Enayat Ullah, Baltimore, MD (US); Anup Bandigadi Rao, San Jose, CA (US); Tung Mai, San Jose, CA (US); Ryan A. Rossi, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1067 days.

(21) Appl. No.: 17/451,260

(22) Filed: Oct. 18, 2021

(65) Prior Publication Data

US 2023/0118785 A1    Apr. 20, 2023

(51) Int. Cl.
*G06N 3/08* (2023.01)
*G06N 3/047* (2023.01)

(52) U.S. Cl.
CPC ............ *G06N 3/08* (2013.01); *G06N 3/047* (2023.01)

(58) Field of Classification Search
CPC ......... G06N 3/0472; G06N 3/047; G06N 3/08
See application file for complete search history.

(56) References Cited

U.S. PATENT DOCUMENTS

| 11,494,496 | B2* | 11/2022 | Grosse | ................... G06F 21/577 |
| 12,277,406 | B2* | 4/2025 | Edelsten | .................. G06N 3/10 |
| 2017/0228645 | A1* | 8/2017 | Wang | ..................... G06N 3/084 |
| 2021/0303725 | A1* | 9/2021 | Hartman | ................ G16H 10/60 |

OTHER PUBLICATIONS

Ginart, Antonio, et al. "Making AI forget you: Data deletion in machine learning." Advances in neural information processing systems 32 (2019). (Year: 2019).*
Bourtoule, Lucas, et al. "Machine Unlearning." arXiv preprint arXiv:1912.03817v3 (2020). (Year: 2020).*
Li, Jincheng, and Wing Wy Ng. "Robust Neural Networks Learning via a Minimization of Stochastic Output Sensitivity." IEEE Access 8 (2020): 205455-205466. (Year: 2020).*

(Continued)

*Primary Examiner* — Randall K. Baldwin
(74) *Attorney, Agent, or Firm* — F. CHAU & ASSOCIATES, LLC

(57) ABSTRACT

Systems and methods for training a neural network are described. One or more embodiments of the present disclosure include training a neural network based on a first combined gradient of a loss function at a plurality of sampled elements of a dataset; receiving an insertion request that indicates an insertion element to be added to the dataset, or a deletion request that indicates a deletion element to be removed from the dataset, wherein the deletion element is one of the plurality of sampled elements; computing a second combined gradient of the loss function by adding the insertion element to the dataset or by replacing the deletion element with a replacement element from the dataset; determining whether the first combined gradient and the second combined gradient satisfy a stochastic condition; and retraining the neural network to obtain a modified neural network based on the determination.

19 Claims, 17 Drawing Sheets

(56) References Cited

OTHER PUBLICATIONS

Sommer, David Marco, et al. "Towards probabilistic verification of machine unlearning." arXiv preprint arXiv:2003.04247 (2020). (Year: 2020).*

Mahadevan, Ananth, and Michael Mathioudakis. "Certifiable machine unlearning for linear models." arXiv preprint arXiv: 2106.15093v3 (Aug. 2021). (Year: 2021).*

Liu, Yang, et al. "Learn to Forget: Machine Unlearning via Neuron Masking." arXiv preprint arXiv:2003.10933v3 (Aug. 2021). (Year: 2021).*

1Ullah, et al., "Machine Unlearning via Algorithmic Stability", arXiv preprint arXiv:2102.13179v1 [cs.LG] Feb. 25, 2021, 68 pages.

* cited by examiner

On dataset S

On dataset S'

Algorithm 1 *sub-sample-GD*$(w_{t_0}, t_0)$

Input: Initial model $w_{t_0}$, data points $\{z_1, \ldots, z_n\}$, $T, m, \eta$ 1: for $t = t_0, t_0 + 1, \ldots, T$ do
2:     Sample mini-batch $b_t$ of size $m$ uniformly randomly
3:     $g_t = \frac{1}{m} \sum_{j \in b_t} \nabla f(w_t, z_j)$
4:     $w_{t+1} = \mathcal{P}(w_t - \eta g_t)$
5:     Save$(b_t, w_t, g_t)$
6: end for

Output: $\hat{w}_S = \frac{1}{T} \sum_{t=1}^{T+1} w_t$

FIG. 14

Algorithm 2 *noisy-m-A-SGD*$(w_{t_0}, t_0)$

Input: Initial model $w_{t_0}$, data points $\{z_1, \ldots, z_n\}$, $T, \eta, m$ 1: $w_0 = 0$
2: for $t = t_0, t_0 + 1, \ldots, T$ do
3:    Sample mini-batch $b_t$ of size $m$ uniformly randomly
4:    Sample $\theta_t \sim \mathcal{N}(0, \sigma^2 \mathbb{I}_d)$
5:    $\mathring{w}_t = (1 - \alpha_t) w_t + \alpha_t w_{t-1}$
6:    $g_t = \frac{1}{m} \sum_{j \in b_t} \nabla f(\mathring{w}_t, z_j)$
7:    $w_{t+1} = \mathcal{P}(\mathring{w}_t - \eta(g_t + \theta_t))$
8:    Save$(b_t, \theta_t, w_t, \mathring{w}_t, g_t)$
9: end for

Output: $\hat{w}_S = w_{T+1}$

FIG. 15

Algorithm 3 Unlearning for *sub-sample-GD*

Input: Data point index $j$ to delete or data point $z$ to insert (index $n+1$)

1: for $t = 1, 2, \ldots, T$ do
2:     Load$(b_t, g_t, w_t)$
3:     if *deletion* and $j \in b_t$ then
4:         sub-sample-GD$(w_t, t)$       // *Continue training on current dataset*
5:         break
6:     else if *insertion* and Bernoulli$(\frac{m}{n+1})$ then
7:         Sample $i \sim$ Uniform$(b_t)$
8:         $g'_t = g_t - \frac{1}{m}(\nabla f(w_t, z_i) - \nabla f(w_t, z))$
9:         $w_{t+1} = P(w_t - \eta(g'_t + \theta_t))$
10:       Save$(w_{t+1}, g'_t, b_t \setminus \{i\} \cup \{n+1\})$
11:       sub-sample-GD$(w_{t+1}, t+1)$     // *Continue training on current dataset*
12:       break
13:     end if
14: end for

FIG. 16

Algorithm 4 Unlearning for *noisy-m-A-SGD*

Input: Data point index $j$ to delete or data point z to insert (index $n+1$)

1: for $t = 1, 2, \ldots, T$ do
2:     Load($\theta_t, w_t, \mathring{w}_t, b_t, g_t$)
3:     if *deletion* and $j \in b_t$ then
4:         Sample $i \sim \text{Uniform}([n] \setminus b_t)$
5:         $g'_t = g_t - \frac{1}{m}(\nabla f(\mathring{w}_t, z_j) - \nabla f(\mathring{w}_t, z_i))$
6:         Save($g'_t, b_t \setminus \{j\} \cup \{i\}$)
7:     else if *insertion* and Bernoulli($\frac{m}{n+1}$) then
8:         Sample $i \sim \text{Uniform}(b_t)$
9:         $g'_t = g_t - \frac{1}{m}(\nabla f(\mathring{w}_t, z_i) - \nabla f(\mathring{w}_t, z))$
10:        Save($g'_t, b_t \setminus \{i\} \cup \{n+1\}$)
11:     else
12:         continue
13:     end if
14:     $\tilde{\zeta}_t = g_t + \theta_t$
15:     if $\text{Unif}(0,1) \geq \frac{\phi_{\mathcal{N}(g'_t, \sigma^2 \mathbb{I})}(\tilde{\zeta}_t)}{\phi_{\mathcal{N}(g_t, \sigma^2 \mathbb{I})}(\tilde{\zeta}_t)}$ then
16:         $\tilde{\zeta}'_t = \text{reflect}(\tilde{\zeta}_t, g'_t, g_t)$
17:         $w_{t+1} = w_t - \eta \tilde{\zeta}'_t$
18:         Save($\tilde{\zeta}'_t$)
19:         *noisy-m-A-SGD*($w_{t+1}, t+1$) // *Continue retraining on current dataset*
20:         break
21:     end if
22: end for

FIG. 17

MACHINE UNLEARNING AND RETRAINING OF A MACHINE LEARNING MODEL BASED ON A MODIFIED TRAINING DATASET

BACKGROUND

The following relates generally to machine learning, and more specifically to machine unlearning.

Machine learning models may be trained to make predictions for a variety of tasks. For example, machine learning models can be used in natural language processing (NLP), image recognition/classification, event extraction tasks, etc. Machine learning models may be trained using supervised learning methods, unsupervised learning method, reinforcement learning methods, or using other training methods.

In some cases, machine learning models are trained using sensitive personal data which may lead to privacy and security issues. If a request is made to remove such personal data, retraining the model can be costly and time consuming. Therefore, there is a need in the art for improved machine learning systems that can remove data without completely retraining a machine learning model.

SUMMARY

The present disclosure describes systems and methods for training a neural network. Some embodiments of the disclosure include a machine learning apparatus configured to retrain a neural network to obtain a modified neural network based on one or more deletion or insertion requests. In some examples, a machine learning model may be trained using a noisy stochastic gradient descent (SGD) method for convex risk minimization. A corresponding unlearning algorithm is used to generate the modified neural network based on constructing maximal coupling of Markov chains for the noisy SGD procedure. The machine learning apparatus can be modified without completely retraining the model. According to an embodiment, an optimal transport algorithm is used to determine whether an equivalence condition is satisfied for each training batch, and the apparatus only retrains the neural network if the equivalence condition is not satisfied.

A method, apparatus, and non-transitory computer readable medium for training a neural network are described. One or more embodiments of the method, apparatus, and non-transitory computer readable medium include training a neural network based on a first combined gradient of a loss function at a plurality of sampled elements of a dataset; receiving an insertion request that indicates an insertion element to be added to the dataset, or, a deletion request that indicates a deletion element to be removed from the dataset, where the deletion element is one of the set of sampled elements; computing a second combined gradient of the loss function by adding the insertion element to the dataset or by replacing the deletion element with a replacement element from the dataset; determining whether the first combined gradient and the second combined gradient satisfy a stochastic condition; and retraining the neural network to obtain a modified neural network based on the determination.

A method, apparatus, and non-transitory computer readable medium for training a neural network are described. One or more embodiments of the method, apparatus, and non-transitory computer readable medium include selecting a plurality of sampled elements from a dataset; computing a first combined gradient of a loss function based on the plurality of sampled elements; training a neural network based on the first combined gradient; receiving a deletion request that indicates a deletion element to be removed from the dataset, wherein the deletion element is one of the plurality of sampled elements; sampling an additional element from the dataset; computing a first partial gradient of the loss function based on the deletion element; computing a second partial gradient of the loss function based on the additional element; computing a second combined gradient of the loss function based on the first partial gradient and the second partial gradient; computing a ratio based on a first probability density of the first combined gradient and a second probability density of the second combined gradient; determining that the ratio fails to satisfy a stochastic condition; computing a reflected gradient based on the determination; and retraining the neural network based on the reflected gradient.

An apparatus and method for training a neural network are described. One or more embodiments of the apparatus and method include operating a neural network that is trained on a dataset in a plurality of minibatches; receiving a deletion request that indicates a deletion element to be removed from the dataset; retraining the neural network based on a modified training dataset that does not include the deletion element by performing an optimal transport algorithm for at least one of the minibatches; and operating the neural network subsequent to a down-time corresponding to the retraining, wherein the down-time is shorter than a second down-time corresponding to a second retraining of the neural network using each of the minibatches.

An apparatus and method for training a neural network are described. One or more embodiments of the apparatus and method include a training component configured to train a neural network based on a first combined gradient of a loss function at a plurality of sampled elements of a dataset; a request component configured to receive a deletion request that indicates a deletion element to be removed from the dataset, wherein the deletion element is one of the plurality of sampled elements; a gradient computation component configured to compute a second combined gradient of the loss function by replacing the deletion element with a replacement element from the dataset; and a stochastic condition component configured to determine whether the first combined gradient and the second combined gradient satisfy a stochastic condition.

BRIEF DESCRIPTION OF THE DRAWINGS

FIG. 14 shows an example of a learning algorithm for training a neural network according to aspects of the present disclosure.

FIG. 15 shows an example of a learning algorithm with a noise parameter for training a neural network according to aspects of the present disclosure.

FIG. 16 shows an example of an unlearning algorithm for re-training a neural network according to aspects of the present disclosure.

FIG. 17 shows an example of an unlearning algorithm with a noise parameter for re-training a neural network according to aspects of the present disclosure.

DETAILED DESCRIPTION

Figure 1:
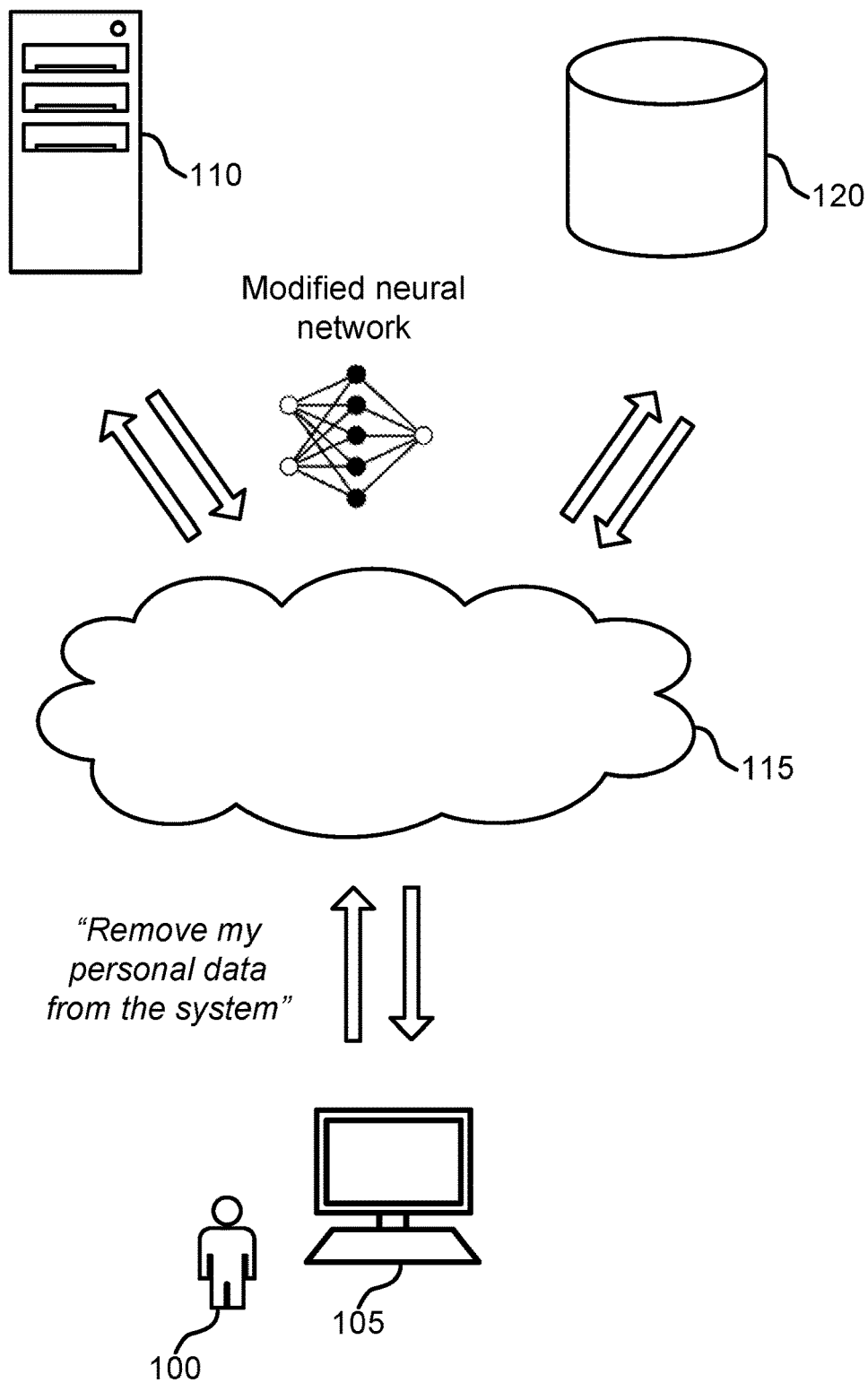
FIG. 1 shows an example of a machine learning system according to aspects of the present disclosure.

The present disclosure describes systems and methods for training a neural network. Some embodiments of the disclosure include a machine learning apparatus configured to retrain a neural network to obtain a modified neural network based on one or more deletion or insertion requests from a user. In some examples, a machine learning model may be trained using a noisy stochastic gradient descent (SGD) method for convex risk minimization. A corresponding unlearning algorithm is used to generate the modified neural network based on constructing maximal coupling of Markov chains for the noisy SGD procedure. In some cases, machine learning models can be modified to remove the dependence on personal data without completely retraining the model. According to an embodiment, an optimal transport algorithm is used to determine whether an equivalence condition is satisfied for each training batch, and the apparatus only retrains the neural network if the equivalence condition is not satisfied.

Machine learning systems are often trained using customer data to create predictive models. However, this can lead to privacy and security issues for users. For example, personal information and sensitive data of users exist on social platforms such as Google® and Facebook®. In some cases, users can request that their personal information be deleted and forgotten by the social platforms. Furthermore, regulatory entities have enacted laws to enforce data privacy rights and customers data ownership. In some cases, these regulations require compliance with data removal requests.

However, conventional systems are not able to perform exact unlearning efficiently. For example, when conventional systems remove an element from an original dataset based on a user deletion request, they must completely retrain a machine learning model based on the new dataset. Therefore, the runtime for training a new model is large.

Additionally, existing "unlearning" algorithms are limited to particular machine learning tasks and not generalizable to other domains, and conventional systems cannot handle insertion requests in addition to deletion requests.

Embodiments of the present disclosure include systems and methods that include "unlearning" algorithms configured to take a request to remove data that has been used to train a machine learning model and restore the model's state to what it would have been if the data were not used in the training. In some examples, a noisy stochastic gradient descent (SGD) method is used to train a neural network. An optimal transport algorithm is used to determine whether an equivalence condition is satisfied for each training batch, and only retrain if the condition is not satisfied. Due to the sequential nature of SGD, if a point to be deleted participates in some iteration (i.e., a training batch), then subsequent steps that are dependent on the to-be-deleted point can be recomputed. If not, the retraining can be avoided.

According to one or more embodiments, an insertion request or a deletion request is made that modifies the training data of a trained machine learning model. One or more of the original training batches are modified based on the insertion request or the deletion request, and the original training batches are evaluated one by one to determine if retraining should be performed. Specifically, an optimal transport algorithm is performed, and a new training gradient function is calculated based on the optimal transport. If the training gradient satisfies an exact unlearning algorithm, the process may proceed to the next training batch without further retraining. By avoiding retraining on some of the training batches, the machine learning model can be retrained faster and more efficiently compared to conventional retraining processes that require the machine learning model to be retrained on each training batch.

By designing efficient unlearning algorithms, the present disclosure can reduce the retraining time (after removal or insertion requests), therefore the total training time is less than existing algorithms because the unlearning algorithms are not dependent on retraining a machine learning model after every request. The total runtime is decreased. Consider a given dataset where the model receives a stream of edit requests (insertion or deletion). The machine learning model is configured, via learning and corresponding unlearning algorithms, such that at every time point in the stream, the output model is the same as what the original model would have become if trained on the current dataset, in small unlearning time. The output models are sufficiently accurate and the unlearning algorithms to achieve these output models are stable.

Accordingly, embodiments of the disclosure can remove personal data without completely retraining the model. As a result, an unlearning algorithm can be performed in less time less than would be required if the model was completely retrained at every user edit request. Furthermore, the accuracy of the model is not degraded. The unlearning algorithm is able to handle edit requests based on efficiently constructing couplings between Markov chains, in some cases maximal couplings. In some examples, rejection sampling and reflection mappings are used. One step of constructing such couplings is verification. The verification step checks whether or not the current model is suitable after the edit request. If the verification is successful, the unlearning algorithm does not incur any additional computation, otherwise the unlearning algorithm does a partial or full recompute (i.e., retrain). This can ensure that the model is accurate and the unlearning is exact without incurring unnecessary retraining costs. Note the verification step can be done efficiently, and it fails with small probability (depending on the Total Variation-stability or TV-stability parameter). Therefore, the machine learning model according to the present disclosure may be operated with a reduced downtime.

Some embodiments of the present disclosure include a machine learning model that trains a neural network based on a first combined gradient of a loss function at a set of sampled elements of a dataset. The machine learning model receives a deletion request that indicates an element to be removed from the dataset. The model computes a second combined gradient of the loss function by replacing the deletion element with a replacement element from the dataset. The model determines whether the first combined gradient and the second combined gradient satisfy a stochastic condition. If the stochastic condition is satisfied, the model moves to another training batch. However, if the stochastic condition is not satisfied, the model retrains the neural network.

Embodiments of the present disclosure may be used in the context of data management. For example, a machine learning system based on the present disclosure may be used to help companies efficiently "unlearn" a machine learning model based on a deletion or insertion request. This is useful when customer data privacy is an issue. An example application in machine "unlearning" is provided with reference to FIGS. 1-3. Details regarding the architecture of an example machine learning apparatus are provided with reference to FIGS. 4-5. An example of a process for training a neural network are provided with reference to FIGS. 6-12.

Machine Learning System

FIG. 1 shows an example of a machine learning system according to aspects of the present disclosure. The example shown includes user 100, user device 105, machine learning apparatus 110, cloud 115, and database 120. Machine learning apparatus 110 is an example of, or includes aspects of, the corresponding element described with reference to FIG. 4.

In the example of FIG. 1, user 100 may provide a deletion request such as a natural language command "remove my personal data from the system". The user device 105 transmits the deletion request to the machine learning apparatus 110. Machine learning apparatus 110 generates a modified neural network based on the deletion request. Machine learning apparatus 110 applies a machine "unlearning" algorithm that can take a request to remove data that has been used to train a machine learning model and restore the model's state to what it would have been if the data were not used in the training.

The user 100 communicates with the machine learning apparatus 110 via the user device 105 and the cloud 115. For example, user 100 is a customer of a third-party vendor collecting dataset to train a machine learning model. User 100 wants to remove her personal data from the dataset that was used to train the machine learning model. In some examples, the user device 105 communicates with the machine learning apparatus 110 via the cloud 115.

Accordingly, machine learning apparatus 110 trains a neural network based on a first combined gradient of a loss function at a set of sampled elements of a dataset and receives a deletion request that indicates a deletion element to be removed from the dataset, where the deletion element is one of the set of sampled elements. Machine learning apparatus 110 computes a second combined gradient of the loss function by replacing the deletion element with a replacement element from the dataset and determines whether the first combined gradient and the second combined gradient satisfy a stochastic condition. Machine learning apparatus 110 retrains the neural network to obtain a modified neural network based on the determination.

A user interface may enable a user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

The user device 105 may be a personal computer, laptop computer, mainframe computer, palmtop computer, personal assistant, mobile device, or any other suitable processing apparatus. In some examples, the user device 105 includes software that incorporates a machine learning model. The software may either include or communicate with the machine learning apparatus 110. In some embodiments, the user device 105 includes a user interface so that a user 100 can upload natural language command via the user interface.

Machine learning apparatus 110 includes a computer implemented network comprising a training component, a request component, a gradient computation component, a stochastic condition component, and a rejection sampling component. Machine learning apparatus 110 trains a neural network based on a first combined gradient of a loss function at a set of sampled elements of a dataset, and receives a deletion request that indicates a deletion element to be removed from the dataset, where the deletion element is one of the set of sampled elements. Machine learning apparatus 110 computes a second combined gradient of the loss function by replacing the deletion element with a replacement element from the dataset, determines whether the first combined gradient and the second combined gradient satisfy a stochastic condition, and retrains the neural network to obtain a modified neural network based on the determination.

Machine learning apparatus 110 may also include a processor unit and a memory unit. Additionally, machine learning apparatus 110 can communicate with the database 120 via the cloud 115. In some cases, the architecture of machine learning apparatus 110 is also referred to as a machine learning model. Further detail regarding the architecture of machine learning apparatus 110 is provided with reference to FIGS. 4-5. Further detail regarding a process for training and retraining a neural network is provided with reference to FIGS. 6-12. Further detail regarding learning and unlearning algorithms of machine learning apparatus 110 is provided with reference to FIGS. 13-16.

In some cases, machine learning apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud is available to many organizations. In one example, a cloud includes a multi-layer communications network comprising multiple edge routers and core routers. In another example, a cloud is based on a local collection of switches in a single physical location.

A database 120 is an organized collection of data. For example, a database 120 stores datasets used for training a neural network in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
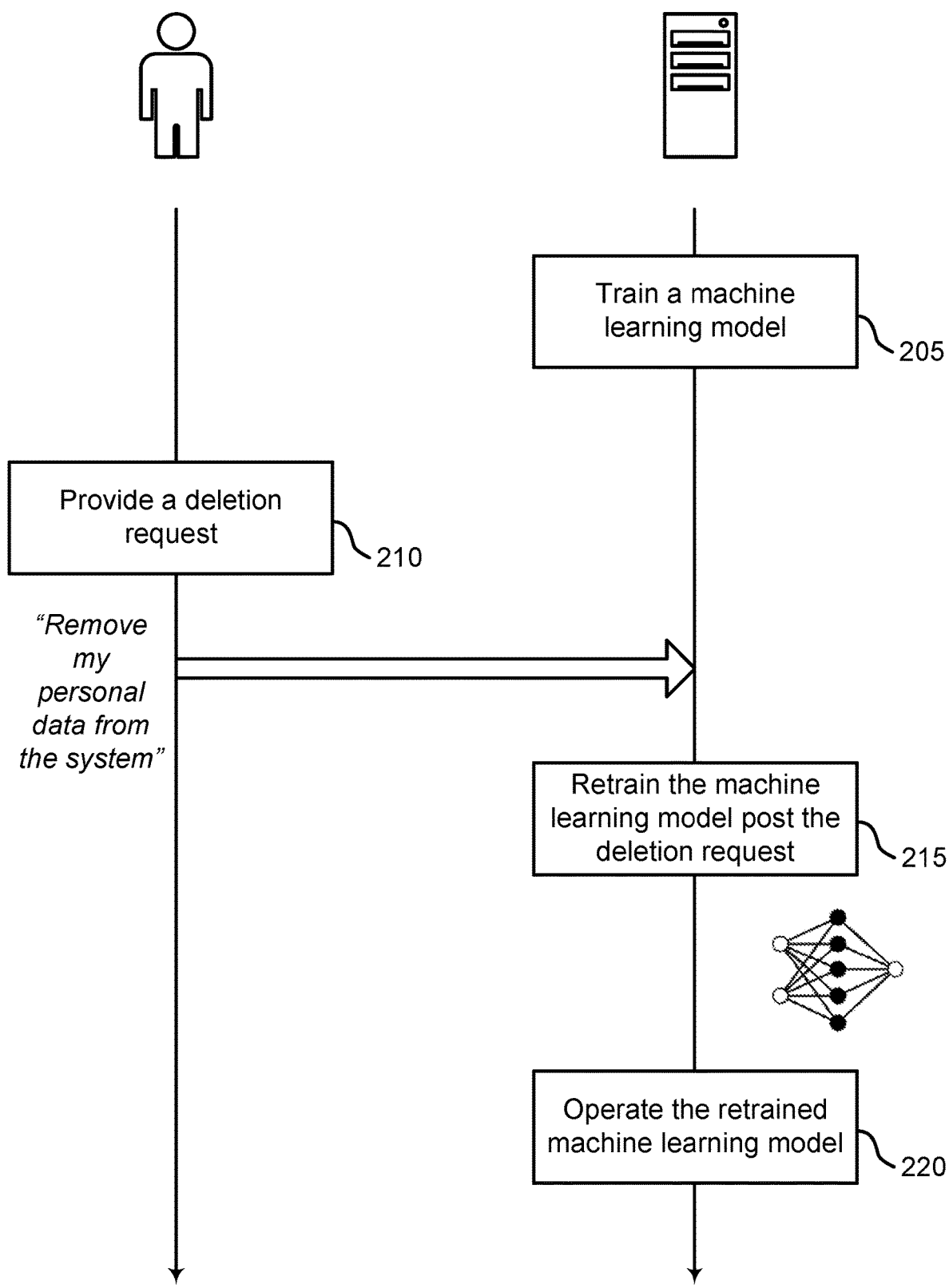
FIG. 2 shows an example of a process for retraining a neural network according to aspects of the present disclosure.

FIG. 2 shows an example of a process for retraining a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system trains a machine learning model. In some cases, the operations of this step refer to, or may be performed by, a machine learning apparatus as described with reference to FIGS. 1 and 4. In some examples, the machine learning model may be trained using stochastic gradient descent (SGD) method. Alternatively or additionally, the machine learning model is trained using an accelerated gradient descent method with Gaussian noise added at each iteration.

At operation 210, the user provides a deletion request. In some cases, the operations of this step refer to, or may be performed by, a user as described with reference to FIG. 1. In some examples, the user provides an insertion request or a sequence of insertion and deletion requests.

Intelligent systems employ user data to solve a variety of tasks, from recommendation systems to facial recognition. With intelligent systems becoming ubiquitous, sensitive personal data can be compromised due to data breaches and poor data management practices. Therefore, advocates for data governance insist on broader awareness of data privacy and issues pertaining to data ownership and stewardship. The efforts made by advocates for data governance resulted in several regulatory bodies enacting laws, for example, European Union General Data Protection Regulation (GDPR) and California Consumer Act (CCA). These laws (e.g., right to be forgotten clause in the GDPR) are directed to empower users with the right to request deletion of personal data or having the data expunged from databases that have been used to train the machine learning model.

At operation 215, the system retrains the machine learning model post the deletion request. In some cases, the operations of this step refer to, or may be performed by, a machine learning apparatus as described with reference to FIGS. 1 and 4.

However, in some cases, simply removing user's data from the database without undoing the computations derived from the user data is insufficient. In some cases, user data are directly used to train models which make predictions and recommendations. A reasonable criterion for data deletion is that the model's state is restored to what it would have been if the user data were absent from the training sample. For example, the updated model post deletion request coincides with the model that would result from training on the dataset that did not include a particular user's datum (referred to as exact unlearning).

At operation 220, the system operates the retrained machine learning model. In some cases, the operations of this step refer to, or may be performed by, a machine learning apparatus as described with reference to FIGS. 1 and 4. In some examples, the user can operate the retrained machine learning model for subsequent tasks. The retrained machine learning model can be implemented on a server or a user device (see FIG. 1).

Figure 3:
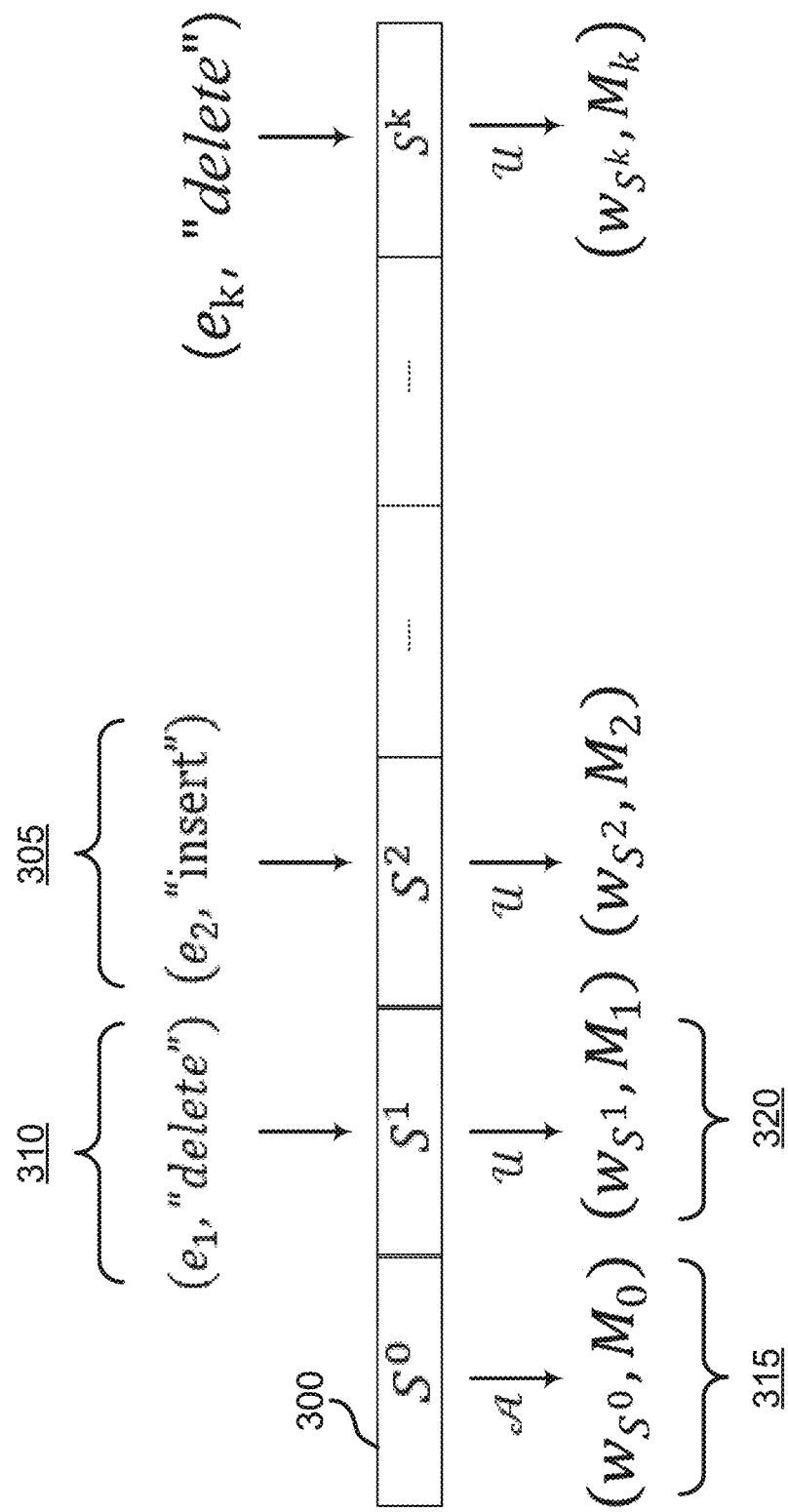
FIG. 3 shows an example of a stream of edit requests including deletion and insertion according to aspects of the present disclosure.

FIG. 3 shows an example of a stream of edit requests including deletion and insertion according to aspects of the present disclosure. The example shown includes dataset 300, insertion request 305, deletion request 310, learning algorithm 315, and unlearning algorithm 320. According to an embodiment, a machine learning system is trained using learning algorithm 315. The machine learning system can handle a stream of edits requests including insertion requests 305 and deletion requests 310 through unlearning algorithm 320. Learning algorithm 315 is an example of, or includes aspects of, the corresponding element described with reference to FIG. 14. Unlearning algorithm 320 is an example of, or includes aspects of, the corresponding element described with reference to FIG. 16.

According to an embodiment, let $Z$ be the data space, $\Theta$ the output/parameter space, and $\mathcal{M}$ be the metadata or state space. A procedure is denoted a tuple $(A(\bullet), U(\bullet))$, where $A: Z \to \Theta \times \mathcal{M}$ is the batch algorithm, and $U: \Theta \times \mathcal{M} \times Z \times Z^* \to \Theta \times \mathcal{M}$ is the update function which updates the current model given an edit request (third argument); the second and fourth argument ensure the update function can be based on the dataset and the metadata stored. In some examples, meta-data may be a sketch of the data points, or intermediate computations or state, which may be used upon edit time. Let $\mathcal{A}(\bullet)$ denote the first output of A i.e., $\mathcal{A}(\bullet)=A_1(\bullet)$. Similarly, let $\mathcal{U}(\bullet)$ denote the first output of U. The algorithm's output refers to the model output (i.e., excluding the metadata).

Neural Network Architecture

Figure 4:
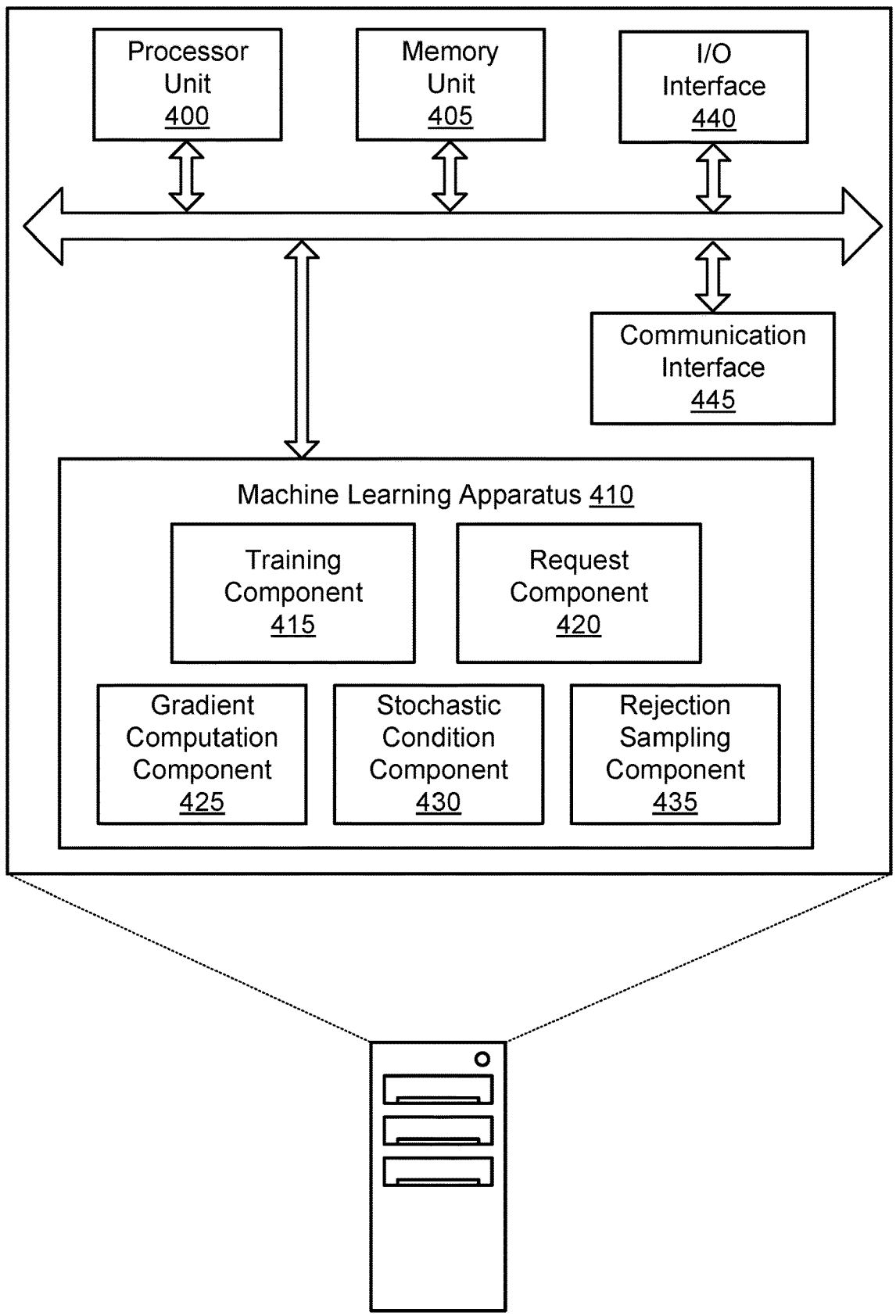
FIG. 4 shows an example of a machine learning apparatus according to aspects of the present disclosure.
Figure 5:
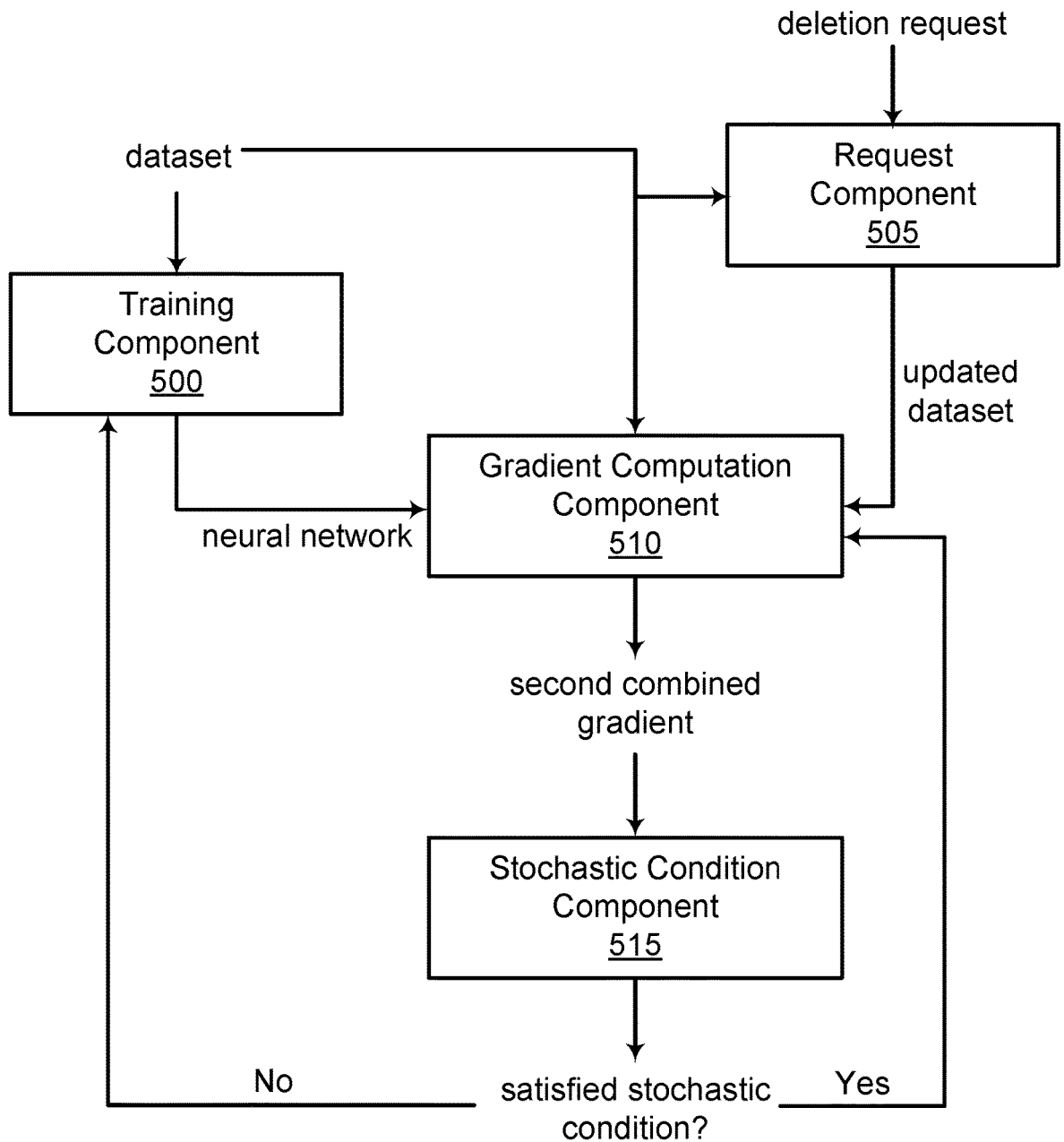
FIG. 5 shows an example of a machine learning diagram according to aspects of the present disclosure.

In FIGS. 4-5, an apparatus and method for training a neural network are described. One or more aspects of the apparatus and method include a training component configured to train a neural network based on a first combined gradient of a loss function at a plurality of sampled elements of a dataset; a request component configured to receive a deletion request that indicates a deletion element to be removed from the dataset, wherein the deletion element is one of the plurality of sampled elements; a gradient computation component configured to compute a second combined gradient of the loss function by replacing the deletion element with a replacement element from the dataset; and a stochastic condition component configured to determine whether the first combined gradient and the second combined gradient satisfy a stochastic condition.

Some examples of the apparatus and method further include a rejection sampling component configured to perform rejection sampling on the sampled elements, wherein the neural network is retrained based on the rejection sampling.

In some embodiments, the training component is configured to retrain the neural network to obtain a modified neural network based on the determination. In some embodiments, the gradient computation component is configured to perform an optimal transport process on the first combined gradient to obtain the second combined gradient.

FIG. 4 shows an example of a machine learning apparatus according to aspects of the present disclosure. The example shown includes processor unit 400, memory unit 405, I/O interface 440, and communication interface 445. The machine learning apparatus 410. The machine learning apparatus 410 further includes training component 415, request component 420, gradient computation component 425, stochastic condition component 430, and rejection sampling component 435. Machine learning apparatus 410 is an example of, or includes aspects of, the corresponding element described with reference to FIG. 1.

According to an embodiment, a machine learning apparatus is configured to handle convex empirical risk minimization (ERM) tasks over a given dataset and a stream of edit requests (i.e., insertion or deletion). A neural network incorporates learning and unlearning algorithms such that at every time point in the stream, the output model is the same as that one would have obtained if trained on the current dataset, in small unlearning time. Additionally, the output models are accurate. Embodiments of the present disclosure evaluate the trade-off between accuracy and unlearning efficiency by designing stable algorithms, and corresponding efficient unlearning algorithms.

In some cases, algorithmic stability is referred to as total variation (TV) stability, which is an algorithmic property that yields an exact unlearning algorithm for machine learning tasks. One or more embodiments include a system for unlearning in k-means clustering using randomized quantization which can be interpreted as a TV stable method, followed by efficient coupling-based unlearning.

A TV stable learning algorithm and a corresponding efficient unlearning algorithm is designed for convex empirical risk minimization (ERM) tasks. Excess empirical risk bounds are given for the TV stable learning and efficient unlearning algorithms. Excess population risk bounds are given by leveraging known connections between generalization and algorithmic stability. According to an embodiment, machine learning apparatus 410 enables preliminary lower bounds on excess empirical and population risk for TV stable algorithms for convex risk minimization.

A processor unit 400 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 400 is configured to operate a memory array using a memory controller. In other cases, a memory controller is integrated into the processor. In some cases, the processor unit 400 is configured to execute computer-readable instructions stored in a memory to perform various functions. In some embodiments, a processor unit 400 includes special purpose components for modem processing, baseband processing, digital signal processing, or transmission processing.

Examples of a memory unit 405 include random access memory (RAM), read-only memory (ROM), or a hard disk. Examples of memory unit 405 include solid state memory and a hard disk drive. In some examples, a memory unit 405 is used to store computer-readable, computer-executable software including instructions that, when executed, cause a processor to perform various functions described herein. In some cases, the memory unit 405 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 405 store information in the form of a logical state.

I/O interface 440 (input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O interface 440 includes user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

Communication interface 445 operates at the boundary between communicating entities and the channel and may also record and process communications. Communication interface 445 is provided herein to enable a processing system coupled to a transceiver (e.g., a transmitter and/or a receiver). In some examples, transceiver is configured to transmit (or send) and receive signals for a communications device via an antenna.

According to some embodiments of the present disclosure, machine learning apparatus 410 includes a computer implemented artificial neural network (ANN) that is trained using a leaning algorithm and can also be retrained using an exact unlearning algorithm. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of a neural network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

In some examples, a supervised training model includes a loss function that compares predictions of a neural network with ground truth training data. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

According to some embodiments, training component 415 trains a neural network based on a first combined gradient of a loss function at a set of sampled elements of a dataset. In some examples, training component 415 retrains the neural network to obtain a modified neural network based on the determination. In some examples, training component 415 computes the first combined gradient by taking an average of partial gradients for the set of sampled elements. Training component 415 adds a noise parameter to the first combined gradient, where the neural network is trained based on the first combined gradient with the added noise parameter. In some examples, training component 415 samples an additional element from the dataset.

In some examples, training component 415 selects the replacement element from a current batch of the dataset. Training component 415 evaluates a subsequent batch of the dataset without retraining the neural network based on the current batch. In some examples, training component 415 computes a first iteration of a model parameter during a first previous training phase. Training component 415 computes a second iteration of the model parameter during a second previous training phase. Training component 415 computes a weighted sum of the first iteration of the model parameter and the second iteration of the model parameter. Training component 415 then computes a third iteration of the model parameter based on the weighted sum and the first combined gradient. In some examples, training component 415 retrains the neural network based on the insertion request. In some examples, training component 415 retrains the modified neural network based on each of the additional deletion requests. In some examples, a total variation distance between an output distribution of the neural network before retraining and a modified output distribution of the modified neural network (after retraining) is less than or equal to a predetermined threshold value.

According to some embodiments, training component 415 selects a set of sampled elements from a dataset. Training component 415 computes a first combined gradient of a loss function based on the set of sampled elements. In some examples, training component 415 retrains the neural network based on the reflected gradient. In some examples, training component 415 proceeds to evaluate a subsequent batch of the dataset without retraining the neural network based on a current batch. Training component 415 is an example of, or includes aspects of, the corresponding element described with reference to FIG. 5.

According to some embodiments, request component 420 receives a deletion request that indicates a deletion element to be removed from the dataset, where the deletion element is one of the set of sampled elements. In some examples, request component 420 receives an insertion request. In some examples, request component 420 divides the dataset to a set of batches, where the training is performed in a set of training phases corresponding to the set of batches. In some examples, request component 420 receives a set of additional deletion requests, where each of the additional deletion requests indicates an additional deletion element of the dataset to be removed. Request component 420 is an example of, or includes aspects of, the corresponding element described with reference to FIG. 5.

According to some embodiments, gradient computation component 425 computes a second combined gradient of the loss function by replacing the deletion element with a replacement element from the dataset. In some examples, gradient computation component 425 performs an optimal transport process on the first combined gradient to obtain the second combined gradient. In some examples, gradient computation component 425 computes a first partial gradient based on the deletion element, where the first combined gradient is based on the first partial gradient. Gradient computation component 425 computes a second partial gradient based on the additional element. Gradient computation component 425 computes the second combined gradient based on the first partial gradient, the second partial gradient, and the first combined gradient. Gradient computation component 425 is an example of, or includes aspects of, the corresponding element described with reference to FIG. 5.

According to some embodiments, stochastic condition component 430 determines whether the first combined gradient and the second combined gradient satisfy a stochastic condition. In some examples, stochastic condition component 430 computes a first probability density based on the first combined gradient and a noise parameter. Stochastic condition component 430 computes a second probability density based on the second combined gradient and the noise parameter. Stochastic condition component 430 then computes a ratio based on the first probability density and the second probability density, where the stochastic condition is based on the ratio. In some examples, stochastic condition component 430 determines that the ratio satisfies the stochastic condition based on the replacement element. In some examples, stochastic condition component 430 determines that the ratio fails to satisfy the stochastic condition.

According to some embodiments, stochastic condition component 430 computes a ratio based on a first probability density of the first combined gradient and a second probability density of the second combined gradient. Stochastic condition component 430 is an example of, or includes aspects of, the corresponding element described with reference to FIG. 5.

According to some embodiments, rejection sampling component 435 performs rejection sampling on the sampled elements, where the neural network is retrained based on the rejection sampling. In some examples, rejection sampling component 435 accepts the replacement element as a sample of the current batch based on satisfying the stochastic condition. In some examples, rejection sampling component 435 computes a reflected gradient based on the determination. Training component 415 retrains the neural network based on the reflected gradient.

One or more embodiments of the present disclosure achieve stability by connecting unlearning to optimal transport and specifying a simple model of computation, where the notion of total variation stability arises naturally. One or more embodiments show an existing differential private solution to be TV stable and designs TV stable algorithms for convex empirical risk minimization. Embodiments of the present disclosure design and analyze efficient unlearning algorithms through constructing couplings between Markov chains using rejection sampling and reflection mappings methods.

Total variation stability from optimal transport is described in greater detail herein. Consider neighboring datasets S and S' and let P=$\mathcal{A}$(S) and Q=A(S') for some randomized algorithm $\mathcal{A}$. The algorithm first computes on S, and then observes edit requests which generate S' as the current dataset. A procedure which moves P to Q is used for exact unlearning. In some examples, optimal transport methods are used. The machine learning model use probability distributions P and Q over spaces $\chi$ and $\mathcal{Y}$ respectively, and a cost function c:$\chi \times \mathcal{Y} \to \mathbb{R}$, the goal, is to transport from P to Q with minimum cost. The Kantorovich formulation of the task includes searching for a probability distribution over $\chi \times \mathcal{Y}$ called transference or transport plans. A transport plan between probability measures P and Q is a joint probability measure $\pi$ whose marginals are P and Q respectively. The marginal condition defines couplings such that the probability mass in the source and destination are conserved. Let $\Pi$(P, Q) denote the set of transport plans (or couplings) on P and Q. The Kantorovich's formulation uses a transport plan $\pi$ which minimizes the expected cost:

$$\min_{\pi \in \Pi(P,Q)} \mathbb{E}_{(x,y) \sim \pi} c(x,y) \text{ (Kantorovich formulation)} \quad (1)$$

One or more embodiments couple P and Q by correlation such that the machine learning model correlates P and Q so that transporting from P to Q can reuse the randomness (computation) used for P. The cost function in the optimal transport task is used as a substitute of modelling computation. In a standard optimal transport task, the choice of the cost function is dependent on the geometry, particularly the metric, on the space—a choice of $\ell_p$ distances give rise to Wasserstein distances. If a vector space structure exists on the output space, and w*(S) and w*(S') denote the optimal solutions for datasets S and S', then a transport could be a shift T(x)=x+w*(S')−w*(S). For example, mean computation wherein w*(S')−w*(S) corresponds to subtracting the mean of dataset S and adding the mean of dataset S'. In some general cases, the computational cost of this transport may be as much as a full re-computation on dataset S'. In some examples, the output spaces might not have a metric or a vector space structure.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of a machine learning diagram according to aspects of the present disclosure. The example shown includes training component 500, request component 505, gradient computation component 510, and stochastic condition component 515.

According to an embodiment, a dataset is input to training component 500, where a neural network is trained based on the dataset. Training component 500 is an example of, or includes aspects of, the corresponding element described with reference to FIG. 4.

According to an embodiment, the dataset and a deletion request (acting upon the dataset) are input to request component 505. In some examples, a user provides an insertion request instead of the deletion request. Request component 505 outputs an updated dataset or a modified dataset. Request component 505 is an example of, or includes aspects of, the corresponding element described with reference to FIG. 4.

According to an embodiment, the trained neural network and updated dataset are input to gradient computation component 510. Gradient computation component 510 outputs a second combined gradient. Gradient computation component 510 is an example of, or includes aspects of, the corresponding element described with reference to FIG. 4.

According to an embodiment, the second combined gradient is input to stochastic condition component 515. If the stochastic condition is satisfied, the machine learning system moves to another training batch (back to gradient computation component 510). If the stochastic condition is not satisfied, the machine learning system retrains the network (back to training component 500). Stochastic condition component 515 is an example of, or includes aspects of, the corresponding element described with reference to FIG. 4.

Training a Neural Network and Retraining

In FIGS. 6-12, a method, apparatus, and non-transitory computer readable medium for training a neural network are described. One or more aspects of the method, apparatus, and non-transitory computer readable medium include training a neural network based on a first combined gradient of a loss function at a plurality of sampled elements of a dataset; receiving a deletion request that indicates a deletion element to be removed from the dataset, wherein the deletion element is one of the plurality of sampled elements; computing a second combined gradient of the loss function by replacing the deletion element with a replacement element from the dataset; determining whether the first combined gradient and the second combined gradient satisfy a stochastic condition; and retraining the neural network to obtain a modified neural network based on the determination.

Some examples of the method, apparatus, and non-transitory computer readable medium further include computing the first combined gradient by taking an average of partial gradients for the plurality of sampled elements. Some examples of the method, apparatus, and non-transitory computer readable medium further include adding a noise parameter to the first combined gradient, wherein the neural network is trained based on the first combined gradient with the added noise parameter. Some examples of the method, apparatus, and non-transitory computer readable medium further include performing an optimal transport process on the first combined gradient to obtain the second combined gradient.

Some examples of the method, apparatus, and non-transitory computer readable medium further include computing a first partial gradient based on the deletion element, wherein the first combined gradient is based on the first partial gradient. Some examples further include sampling an additional element from the dataset. Some examples further include computing a second partial gradient based on the additional element. Some examples further include computing the second combined gradient based on the first partial gradient, the second partial gradient, and the first combined gradient.

Some examples of the method, apparatus, and non-transitory computer readable medium further include performing rejection sampling on the sampled elements, wherein the neural network is retrained based on the rejection sampling. Some examples of the method, apparatus, and non-transitory computer readable medium further include computing a first probability density based on the first combined gradient and a noise parameter. Some examples further include computing a second probability density based on the second combined gradient and the noise parameter. Some examples further include computing a ratio based on the first probability density and the second probability density, wherein the stochastic condition is based on the ratio.

Some examples of the method, apparatus, and non-transitory computer readable medium further include selecting the replacement element from a current batch of the dataset. Some examples further include determining that the ratio satisfies the stochastic condition based on the replacement element. Some examples further include accepting the replacement element as a sample of the current batch based on satisfying the stochastic condition. Some examples further include evaluating a subsequent batch of the dataset without retraining the neural network based on the current batch.

Some examples of the method, apparatus, and non-transitory computer readable medium further include determining that the ratio fails to satisfy the stochastic condition. Some examples further include computing a reflected gradient based on the determination. Some examples further include retraining the neural network based on the reflected gradient.

Some examples of the method, apparatus, and non-transitory computer readable medium further include computing a first iteration of a model parameter during a first previous training phase. Some examples further include computing a second iteration of the model parameter during a second previous training phase. Some examples further include computing a weighted sum of the first iteration of the model parameter and the second iteration of the model parameter. Some examples further include computing a third iteration of the model parameter based on the weighted sum and the first combined gradient.

Some examples of the method, apparatus, and non-transitory computer readable medium further include receiving an insertion request. Some examples further include retraining the neural network based on the insertion request. Some examples of the method, apparatus, and non-transitory computer readable medium further include dividing the dataset to a plurality of batches, wherein the training is performed in a plurality of training phases corresponding to the plurality of batches.

Some examples of the method, apparatus, and non-transitory computer readable medium further include receiving a plurality of additional deletion requests, wherein each of the additional deletion requests indicates an additional deletion element of the dataset to be removed. Some examples further include retraining the modified neural network based on each of the additional deletion requests. Some examples of the method, apparatus, and non-transitory computer readable medium further include a total variation distance between an output distribution of the neural network before retraining and a modified output distribution of the modified neural network is less than or equal to a predetermined threshold value.

A method, apparatus, and non-transitory computer readable medium for training a neural network are described. One or more embodiments of the method, apparatus, and non-transitory computer readable medium include selecting a plurality of sampled elements from a dataset; computing a first combined gradient of a loss function based on the plurality of sampled elements; training a neural network based on the first combined gradient; receiving a deletion request that indicates a deletion element to be removed from the dataset, wherein the deletion element is one of the plurality of sampled elements; sampling an additional element from the dataset; computing a first partial gradient of the loss function based on the deletion element; computing a second partial gradient of the loss function based on the additional element; computing a second combined gradient of the loss function based on the first partial gradient and the second partial gradient; computing a ratio based on a first probability density of the first combined gradient and a second probability density of the second combined gradient; determining that the ratio fails to satisfy a stochastic condition; computing a reflected gradient based on the determination; and retraining the neural network based on the reflected gradient.

Some examples of the method, apparatus, and non-transitory computer readable medium further include determining that the ratio satisfies the stochastic condition. Some examples further include proceeding to evaluate a subsequent batch of the dataset without retraining the neural network based on a current batch.

Figure 6:
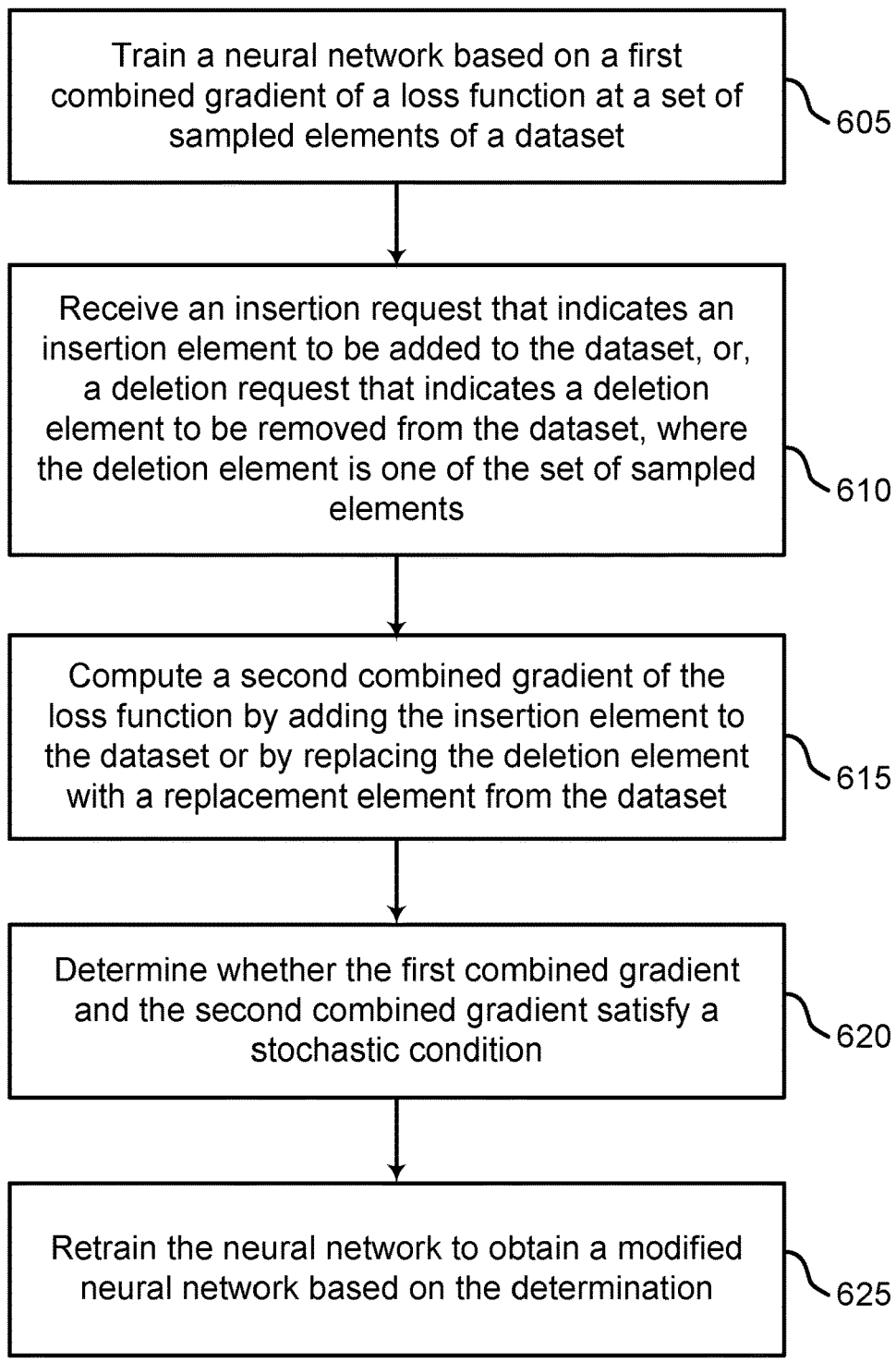
FIG. 6 shows an example of a process for retraining a neural network according to aspects of the present disclosure.

FIG. 6 shows an example of a process for retraining a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment, S is an initial dataset, S' is the dataset after one edit request, and design of a transport from P=$\mathcal{A}$(S) to Q=$\mathcal{A}$(S'), through constructing a coupling of P and Q. In some cases, data access is restricted (i.e., when generating a sample from P, Q is unknown), and as a result, the coupling cannot be based on efficiently sampling from a joint distribution directly, and is limited to work with samples generated from P. Additionally, construction of the coupling may be computationally more efficient than drawing independent samples from P and Q.

The diagonal of two probability distributions under a coupling $\pi$, is the set $\{p=q\}$ where (p, q)~$\pi$, and the nondiagonal is the set $\{p\neq q\}$, (p, q)~$\pi$. The measure of the non-diagonal under a maximal coupling $\pi^*$ is $\mathbb{P}_{(p,q)\sim\pi^*}\mathbb{1}\{p\neq q\}$=TV(P, Q). Hence when using p-TV stable algorithms, the probability measure of the diagonal under a maximal coupling is large (i.e., at least 1−$\rho$). The unlearning method includes two stages, i.e., verification and re-computation. The machine learning model first verifies whether the output on dataset S (i.e., sample from P) falls on the diagonal of any maximal coupling of P and Q or not—if that is indeed the case, then the same sample for Q suffices. Verification using the machine learning model is computationally cheaper than recomputing (less than $\rho$·recompute cost). If the verification fails, the machine learning model samples from the non-diagonal of any maximal coupling P and Q to obtain a valid transport. In some cases, the computational cost of re-computation is of the same order as full recompute. As a result, for k edit requests, the expected computation cost for unlearning is k verification cost+ k$\rho$·recompute cost≈k$\rho$·recompute cost.

At operation 605, the system trains a neural network based on a first combined gradient of a loss function at a set of sampled elements of a dataset. In some cases, the operations of this step refer to, or may be performed by, a training component as described with reference to FIGS. 4 and 5.

According to an embodiment, two datasets S and S' are given and $\Delta$(S, S') is used to denote the symmetric difference between the datasets, i.e., $\Delta$(S, S')=|S\S'|+|S'\S|. Given measure spaces (X,$\mathcal{B}_X$,$\mathcal{P}_X$) and (Y,$\mathcal{B}_Y$,$\mathcal{P}_Y$), a random variable T is a $\mathcal{P}_X$-measurable map T:X→Y. The push-forward of measure $\mathcal{P}_X$ under T is denoted by $T_\#\mathcal{P}_X$. In an embodiment, the neural network is configured to calculate distances and divergence between probability distributions. In some cases, notation and a divergence or distance between random variables instead of probability distributions may be used which are interpreted as the law of the random variables (i.e., push-forward measures of the probability measure in the domain space under the random variable map). For a random variable R, $\phi_R$ and $\Phi_R$ are used to denote the probability density and cumulative distribution functions of R, if it exists, respectively.

At operation 610, the system receives an insertion request that indicates an insertion element to be added to the dataset, or a deletion request that indicates a deletion element to be removed from the dataset, where the deletion element is one of the set of sampled elements. In some cases, the operations of this step refer to, or may be performed by, a request component as described with reference to FIGS. 4 and 5.

Gradient-based optimization is an algorithmic method used for machine learning. The sequential nature of gradient descent methods makes designing unlearning algorithms non-trivial (e.g., those that satisfy an exact unlearning criterion). For example, if a point to be deleted participates in some iteration, then the subsequent steps are dependent on the to-be-deleted point and the computations are redone. As a result, unlearning is performed in time less than retraining at every edit request, while maintaining accuracy of the models.

Exact unlearning is defined as follows. A procedure (A, U) satisfies exact unlearning if for any S, S'⊂X* such that $\Delta$(S, S')=1, A(S')=U($\mathcal{A}$(S), S'\S∪S\S', S). For randomized procedures, A(S')=$_d$U($\mathcal{A}$(S), S'\S∪S\S', S), where=$_d$ denotes equality of probability distributions. In some examples, a relaxation of the definition of exact unlearning is to maintain that only the output (i.e., not the metadata) satisfies the condition $\mathcal{A}$(S')=$\mathcal{U}$(A(S),S'\S∪S\S',S).

The above definition of exact unlearning is for one edit request and can be generalized for a stream of k edit requests, by having the condition $\mathcal{A}$(S')=$\mathcal{U}$($\Delta$(S), S'\S∪S\S', S) hold inductively for every point in the stream.

Let S=S$^0$={$z_1$, $z_2$, . . . , $z_n$}, $z_i\in\mathbb{Z}$ be a given set of initialized data points. k edit requests are observed, each being either an insertion or deletion request. Let S$^i$ denote the set of data points available at time i in the stream. At any point in the stream, the number of available data points are assumed at least n/2 and at most 2n.

At operation 615, the system computes a second combined gradient of the loss function by adding the insertion element to the dataset or by replacing the deletion element with a replacement element from the dataset. In some cases, the operations of this step refer to, or may be performed by, a gradient computation component as described with reference to FIGS. 4 and 5.

At operation 620, the system determines whether the first combined gradient and the second combined gradient satisfy a stochastic condition. In some cases, the operations of this step refer to, or may be performed by, a stochastic condition component as described with reference to FIGS. 4 and 5.

At operation 625, the system retrains the neural network to obtain a modified neural network based on the determination. In some cases, the operations of this step refer to, or may be performed by, a training component as described with reference to FIGS. 4 and 5.

Regarding convex optimization, let $\mathcal{W}\subseteq\mathbb{R}^d$ be a convex set such that diameter ($\mathcal{W}$)≤D where the diameter is measured in Euclidean distance. Let $\mathbb{Z}$ be the instance space and let $f: \mathcal{W}\times\mathbb{Z}\to\mathbb{R}$ be an L-Lipschitz convex function in the first argument. For the constraint set $\mathcal{W}$, given a point w, a projection function $\mathcal{P}:\mathbb{R}^d \to \mathbb{R}^d$ returns $\mathcal{P}(w) \in \operatorname{argmin}_{v \in \mathcal{W}} \|w-v\|$. The function $f$ is L-smooth in the first argument if $\|\nabla_w f(w_1,z) - \nabla_w f(w_2,z)\| \leq L \|w_1 - w_2\| \forall w_1, w_2 \in \mathcal{W}, z \in \mathcal{Z}$. The function $f$ is $\lambda$-strongly convex in the first argument if:

$$(\nabla_w f(w_1,z) - \nabla_w f(w_2,z), w_1 - w_2) \geq \lambda \|w_1 - w_2\|^2 \forall w_1, w_2 \in \qquad (2)$$

The four cases for $f$ in machine learning are smooth, strongly convex (e.g., ridge-regression); smooth, non-strongly convex (e.g., non-regularized logistic regression); non-smooth, strongly convex (e.g., SVM); and non-smooth, non-strongly convex (e.g., $\ell_1$ regression). In some embodiments, smooth convex functions are used herein.

One or more embodiments of the present disclosure include empirical risk minimization (ERM) tasks given data points $S = \{z_1, z_2, \ldots, z_n\}$.

$$\min_{w \in \mathcal{W}} \left\{ \hat{F}_S(w) := \frac{1}{n} \sum_{j=1}^{n} f(w, z_i) \right\} \qquad (3)$$

According to an embodiment, let $\mathcal{A}(S)$ be the output of algorithm $\mathcal{A}$ on dataset S. Guarantees are given on expected excess empirical risk, which is $\mathbb{E} \hat{F}(\mathcal{A}(S)) - F(w_S^*)$ where $w_S^*$ is the minimizer:

$$w_s^* \in \operatorname*{argmin}_{w \in \mathcal{W}} \hat{F}_S(w)$$

and the expectation is taken with respect to the randomness in algorithm $\mathcal{A}$.

According to an embodiment, the machine learning system takes into account risk minimization. The population risk of w, denoted by F(w) is defined as $$F(w) := \mathbb{E}_{z \sim \mathcal{D}} f(w, z),$$

where $\mathcal{D}$ is an unknown probability distribution. Given an output of algorithm $\mathcal{A}$ on dataset $S = \{z_i\}_i$ where $z_i \sim \mathcal{D}$ i.i.d., denoted as $\mathcal{A}(S)$, guarantees are given on the expected excess population risk, defined as $\mathbb{E} F(\mathcal{A}(S)) - F(w^*)$, where $w^*$ is the population risk minimizer:

$$w^* \in \operatorname*{argmin}_{w \in \mathcal{W}} F(w),$$

and the expectation is taken with respect to randomness in algorithm $\mathcal{A}$ and sampling S.

According to an embodiment, total variation (TV) distance between two distributions P and Q is defined as follows:

$$TV(P,Q) = \sup_{\text{measurable sets } R} |P(R) - Q(R)| = \frac{1}{2} \|\phi_P - \phi_Q\|_1 \qquad (4)$$

where the second equality holds if both distributions have probability densities with respect to a base measure which are denoted by $\phi_P$ and $\phi_Q$ respectively. Total variation stability (TV-stability) is defined as follows (i.e., algorithmically stability)

The definition of $\rho$-TV stability considers the marginals of output (i.e., does not include the metadata). Suppose S is a dataset of n points, and S' is a dataset of n+$k_2$ points such that $|S \setminus S'| = k_1$. Then, if algorithm $\mathcal{A}$ is $\rho$-TV stable, then by triangle inequality of TV and repeated applications of the above $\rho$-TV stability definition, $TV(\mathcal{A}(S), \mathcal{A}(S')) \leq (2k_1 + k_2)\rho$.

According to some embodiments of the present disclosure, maximal coupling characterization of total variation distance is used in the implementation of unlearning algorithms (see FIGS. 15 and 16).

A coupling between two probability distributions P and Q over a common measurable space $(\chi, \mathcal{B})$, where $\mathcal{B}$ denotes the (Borel) sigma-algebra on $\chi$, is a distribution $\pi \in \mathbb{P}(\chi \times \chi, \sigma(\mathcal{B} \times \mathcal{B}))$ such that the marginals along the projections $(x, y) \to x$ and $(x, y) \to y$ are P and Q respectively. Let $\Pi(P, Q)$ denote the set of couplings between P and Q. The maximal coupling characterization of total variation distance is defined such that for any coupling $\pi \in \Pi(P, Q)$, if the random variable $(p, q) \sim \pi$, then $TV(P, Q) \leq \mathbb{P}[p \neq q]$.

There exists a maximal coupling $\pi^*$ such that if $(p, q) \sim \pi^*$, then $TV(P, Q) = \mathbb{P}[p \neq q]$. The definition of maximal coupling characterization of total variation distance establishes that $TV(P, Q) = \inf_{\pi \in \Pi(P,Q)} \mathbb{P}_{(p,q) \sim \pi}[p \neq q]$.

Figure 7:
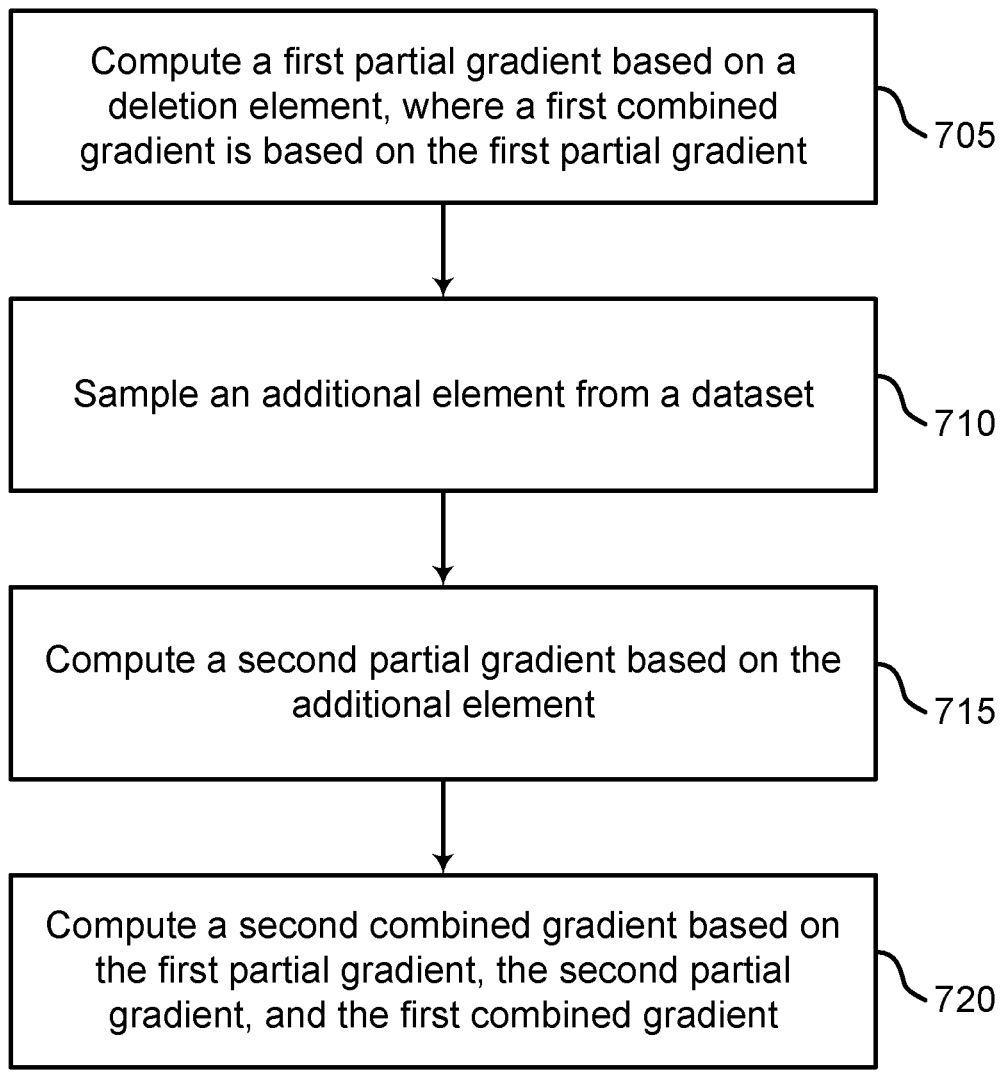
FIG. 7 shows an example of a process for computing a second combined gradient according to aspects of the present disclosure.

FIG. 7 shows an example of a process for computing a second combined gradient according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system computes a first partial gradient based on the deletion element, where the first combined gradient is based on the first partial gradient. In some cases, the operations of this step refer to, or may be performed by, a gradient computation component as described with reference to FIGS. 4 and 5. In some examples, the first partial gradient is $\nabla f(\hat{w}_t, z_j)$.

At operation 710, the system samples an additional element from the dataset. In some cases, the operations of this step refer to, or may be performed by, a training component as described with reference to FIGS. 4 and 5.

According to an embodiment, when a user provides a deletion request, the system samples i by executing a function Uniform which uniformly samples from n points of dataset S that have not been sampled in that iteration (i.e., not belonging to mini-batch $b_t$). When a user provides an insertion request, the system samples i by executing a function Uniform which uniformly samples from a mini-batch $b_t$.

At operation 715, the system computes a second partial gradient based on the additional element. In some cases, the operations of this step refer to, or may be performed by, a gradient computation component as described with reference to FIGS. 4 and 5. In some examples, the second partial gradient is $\nabla f(w_t, z_i)$.

At operation 720, the system computes the second combined gradient based on the first partial gradient, the second partial gradient, and the first combined gradient. In some cases, the operations of this step refer to, or may be performed by, a gradient computation component as described with reference to FIGS. 4 and 5. In some examples, the second combined gradient is $g'_t$, where $g'_t$ is set equal to $$g_t - \frac{1}{m}(\nabla f(\mathring{w}_t, z_i) - \nabla f(\mathring{w}_t, z)).$$

Figure 8:
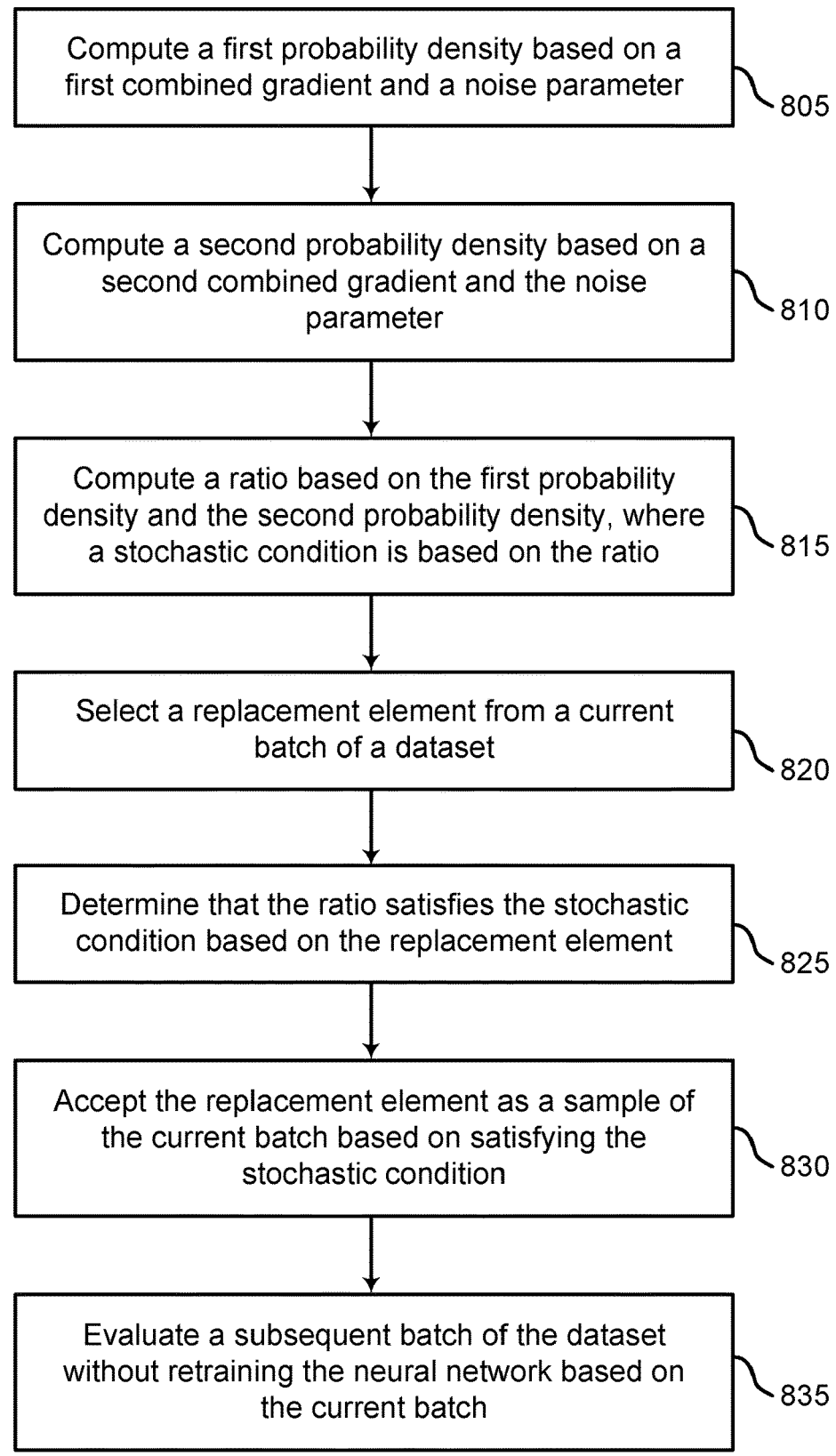
FIG. 8 shows an example of a process for accepting a replacement element as a sample based on satisfied stochastic condition according to aspects of the present disclosure.

FIG. 8 shows an example of a process for accepting a replacement element as a sample based on satisfied stochastic condition according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system computes a first probability density based on the first combined gradient and a noise parameter. In some cases, the operations of this step refer to, or may be performed by, a stochastic condition component as described with reference to FIGS. 4 and 5. According to an embodiment, the first probability density is $\phi_{\mathcal{N}(g_t, \sigma^2 \mathbb{I})}(\xi_t)$. The first probability density is based on the first combined gradient $g_t$ and a noise parameter $\theta_t$.

At operation 810, the system computes a second probability density based on the second combined gradient and the noise parameter. In some cases, the operations of this step refer to, or may be performed by, a stochastic condition component as described with reference to FIGS. 4 and 5. According to an embodiment, the second probability density is $\phi_{\mathcal{N}(g'_t, \sigma^2 \mathbb{I})}(\xi_t)$. The second probability density is based on the second combined gradient $g'_t$ and the noise parameter $\theta_t$.

At operation 815, the system computes a ratio based on the first probability density and the second probability density, where the stochastic condition is based on the ratio. In some cases, the operations of this step refer to, or may be performed by, a stochastic condition component as described with reference to FIGS. 4 and 5.

According to an embodiment, mini-batches are first coupled in the learning algorithm which amounts to replacing the deleted point by a uniformly random point, or inserting the new point in some mini-batches: let the coupled minibatches be $$\{b_j^P\}_{j=1}^T \text{ and } \{b_j^Q\}_{j=1}^T.$$

Next, a rejection sampling step is performed at every iteration, where a machine learning model draws a uniform random variable u~Unif(0, 1), and checks if $$u \leq \frac{\phi_Q(w_j | b_j^Q)}{\phi_P(w_j | b_j^P)},$$

where $w_j$ is sample from P, $$\phi_P(w_j | b_j^P) \text{ and } \phi_Q(w_j | b_j^Q)$$

are conditional probability densities (which are just Gaussians) evaluated at $w_j$, $b_j^P$ and $w_j$, $b_j^Q$ respectively. Note $w_j$ is a sample from P.

According to an embodiment, the system computes the ratio $$\frac{\phi_{\mathcal{N}(g'_t, \sigma^2 \mathbb{I})}(\xi_t)}{\phi_{\mathcal{N}(g_t, \sigma^2 \mathbb{I})}(\xi_t)}$$

via an unlearning algorithm. The stochastic condition is based on the ratio.

At operation 820, the system selects the replacement element from a current batch of the dataset. In some cases, the operations of this step refer to, or may be performed by, a training component as described with reference to FIGS. 4 and 5.

At operation 825, the system determines that the ratio satisfies the stochastic condition based on the replacement element. In some cases, the operations of this step refer to, or may be performed by, a stochastic condition component as described with reference to FIGS. 4 and 5.

According to an embodiment, If the step succeeds, the machine learning model accepts $w_j$ as a sample from Q and moves to the next iteration, and the steps are repeated. If any of the rejection sampling step fails (refer to FIG. 9), for example at step t, $w_{t+1}^Q$ is generated by reflecting $w_{t+1}^P$ about the mid-point of means of the two Gaussians at step t for P and Q. After the reflection step, the machine learning model abandons the rest of iterates from P and generates the new iterates from Q by continuing retraining on dataset S' (see algorithm 1600 in FIG. 16). The method above can be implemented using suitable data structures.

At operation 830, the system accepts the replacement element as a sample of the current batch based on satisfying the stochastic condition. In some cases, the operations of this step refer to, or may be performed by, a rejection sampling component as described with reference to FIG. 5.

At operation 835, the system evaluates a subsequent batch of the dataset without retraining the neural network based on the current batch. In some cases, the operations of this step refer to, or may be performed by, a training component as described with reference to FIGS. 4 and 5.

Figure 9:
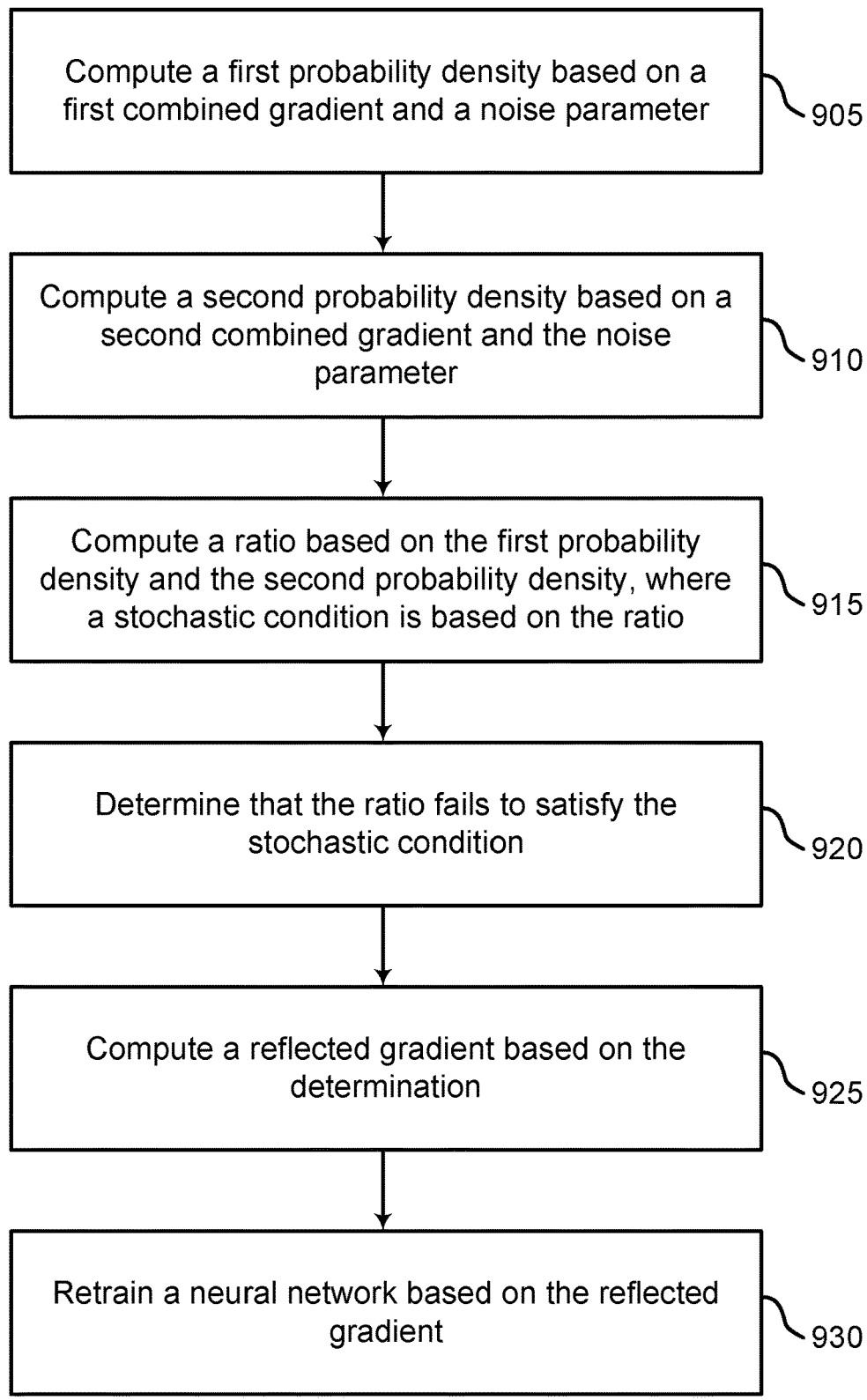
FIG. 9 shows an example of a process for retraining a neural network based on unsatisfied stochastic condition according to aspects of the present disclosure.

FIG. 9 shows an example of a process for retraining a neural network based on unsatisfied stochastic condition according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system computes a first probability density based on the first combined gradient and a noise parameter. In some cases, the operations of this step refer to, or may be performed by, a stochastic condition component as described with reference to FIGS. 4 and 5. According to an embodiment, the first probability density is $\phi_{\mathcal{N}(g_t, \sigma^2 \mathbb{I})}(\xi_t)$. The first probability density is based on the first combined gradient $g_t$ and a noise parameter $\theta_t$.

At operation 910, the system computes a second probability density based on the second combined gradient and the noise parameter. In some cases, the operations of this step refer to, or may be performed by, a stochastic condition component as described with reference to FIGS. 4 and 5. According to an embodiment, the second probability density is $\phi_{\mathcal{N}(g'_t,\sigma^2\mathbb{I})}(\xi_t)$. The second probability density is based on the second combined gradient $g'_t$ and the noise parameter $\theta_t$.

At operation 915, the system computes a ratio based on the first probability density and the second probability density, where the stochastic condition is based on the ratio. In some cases, the operations of this step refer to, or may be performed by, a stochastic condition component as described with reference to FIGS. 4 and 5.

According to an embodiment, an unlearning algorithm draws a uniform random variable by rejection sampling at every iteration using a function Unif(0, 1). The function Unif(0, 1) is compared to the ratio $$\frac{\phi_{\mathcal{N}(g'_t,\sigma^2\mathbb{I})}(\xi_t)}{\phi_{\mathcal{N}(g_t,\sigma^2\mathbb{I})}(\xi_t)}.$$

At operation 920, the system determines that the ratio fails to satisfy the stochastic condition. In some cases, the operations of this step refer to, or may be performed by, a stochastic condition component as described with reference to FIGS. 4 and 5.

According to an embodiment, if the function Unif(0, 1) is larger than or equal to $$\frac{\phi_{\mathcal{N}(g'_t,\sigma^2\mathbb{I})}(\xi_t)}{\phi_{\mathcal{N}(g_t,\sigma^2\mathbb{I})}(\xi_t)},$$

the system determines that the ratio fails to satisfy the stochastic condition. The unlearning algorithm is executed to call function reflect($\xi_t,g'_t,g_t$) which finds the reflection of $\xi_t$ under $(g'_t,g_t)$. The unlearning algorithm creates a new variable $\xi'_t$ and sets $\xi'_t$ equal to the value of the reflect function. Then, $w_{t+1}$ is set equal to $w_t-\eta\xi'_t$.

At operation 925, the system computes a reflected gradient based on the determination. In some cases, the operations of this step refer to, or may be performed by, a rejection sampling component as described with reference to FIG. 5.

At operation 930, the system retrains the neural network based on the reflected gradient. In some cases, the operations of this step refer to, or may be performed by, a rejection sampling component as described with reference to FIG. 5.

Figure 10:
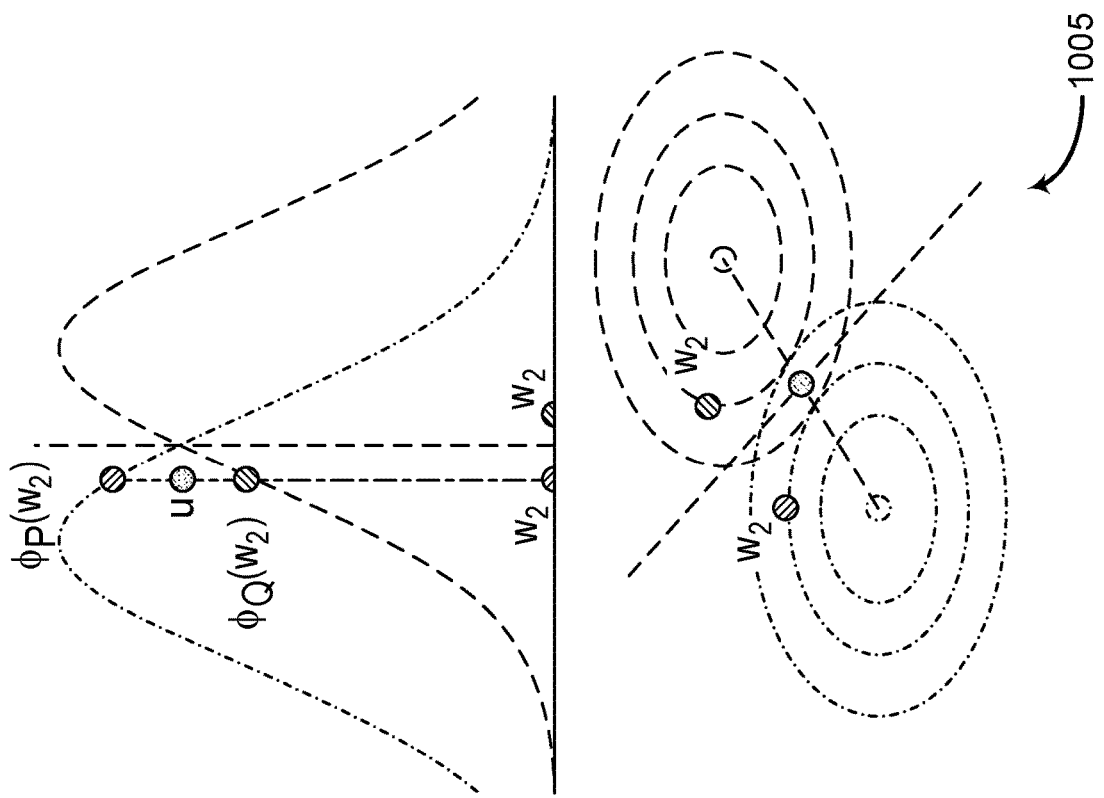
FIG. 10 shows an example of rejection sampling and reflection method according to aspects of the present disclosure.
Figure 10:
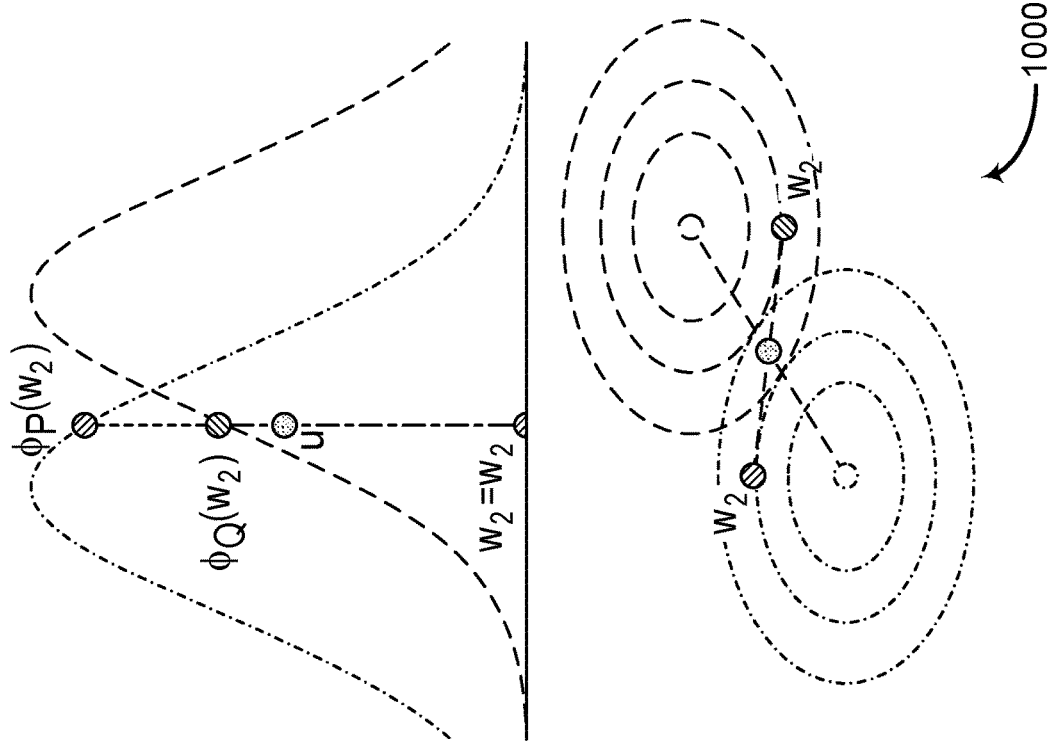

FIG. 10 shows an example of rejection sampling and reflection method according to aspects of the present disclosure. The example shown includes satisfied stochastic condition 1000 and unsatisfied stochastic condition 1005.

Reflection maps may be used in coupling construction and are defined as follows. Given a vector u and two vectors x and y, the reflection of u under (x, y), denoted as reflect (u, x, y), is defined as:

$$\text{reflect}(u,x,y)=x+(y-u) \quad (5)$$

Reflection coupling is used to construct couplings between symmetric probability distributions. The reflection map, given u, x, y, reflects u about the mid-point of x and y. In one embodiment, u may be a sampled point from a Gaussian under old dataset S (i.e., S is the dataset used to train the machine learning model), and x and y are the means of the Gaussian under new dataset S' (i.e., after an edit request) and S respectively. The reflection map uses the spherical symmetry of the Gaussian to generate a good sample for the distribution under S'.

According to some embodiments of the present disclosure, an unlearning algorithm includes a rejection sampling method to iteratively verify each model $w_{t+1}$. For example, at each iteration, the machine learning model checks if the noisy iterate, defined as $\overline{w}_{t+1}=\mathring{w}_t-\eta(g_t+\theta_t)$ is a good sample for the dataset S'. Note $g_t$ is the gradient computed on $\mathring{w}_t$ using a uniform sub-sample from dataset S. The model computes a ratio of estimated marginal densities of $w_{t+1}$ for both datasets, evaluated at the noisy iterate, and the model compares it against a uniform sample from (0, 1). If it succeeds, the algorithm moves to the next iteration, and the process is repeated. If any of the rejection sampling fails, the model performs a reflection, and then continues retraining on the dataset S'.

Estimated marginal densities are described as follows. In some examples, all iterates before iteration t are fixed, and noisy iterate $\overline{w}_{t+1}=\mathring{w}_t-\eta(g_t+\theta_t)$ is considered. In some cases, the sampled mini-batch $b_t$ is also fixed, then $\overline{w}_{t+1}$ is distributed as $\mathcal{N}$ ($\mathring{w}_t-\eta g_t, \eta^2\sigma^2\mathbb{I}$ ). Once $b_t$ is unfixed, then $\overline{w}_{t+1}$ is mixture of Gaussians, with the number of components being exponential in m. Rejection sampling depends on computing the marginal density of the distribution of $w_{t+1}$ (and $w'_{t+1}$ — the iterate for dataset S') evaluated at $\mathring{w}_t-\eta(g_t+\theta_t)$. As a result, the coupled mini-batches indices are used as a sample from the mixture and the model estimates the marginal density using the conditional density (see line 15 of algorithm 1600). Additionally, the ratio of conditional densities of noisy gradients is evaluated rather than iterates, and the ratio is invariant to the shift and scaling.

According to an embodiment, noisy-m-A-SGD learning and unlearning algorithms (algorithm 1400, algorithm 1600) satisfies exact unlearning. Additionally, for k edits, noisy-m-A-SGD unlearning algorithm (algorithm 1600) recomputes with probability at most $$\frac{k\rho\sqrt{T}}{4}.$$

Figure 11:
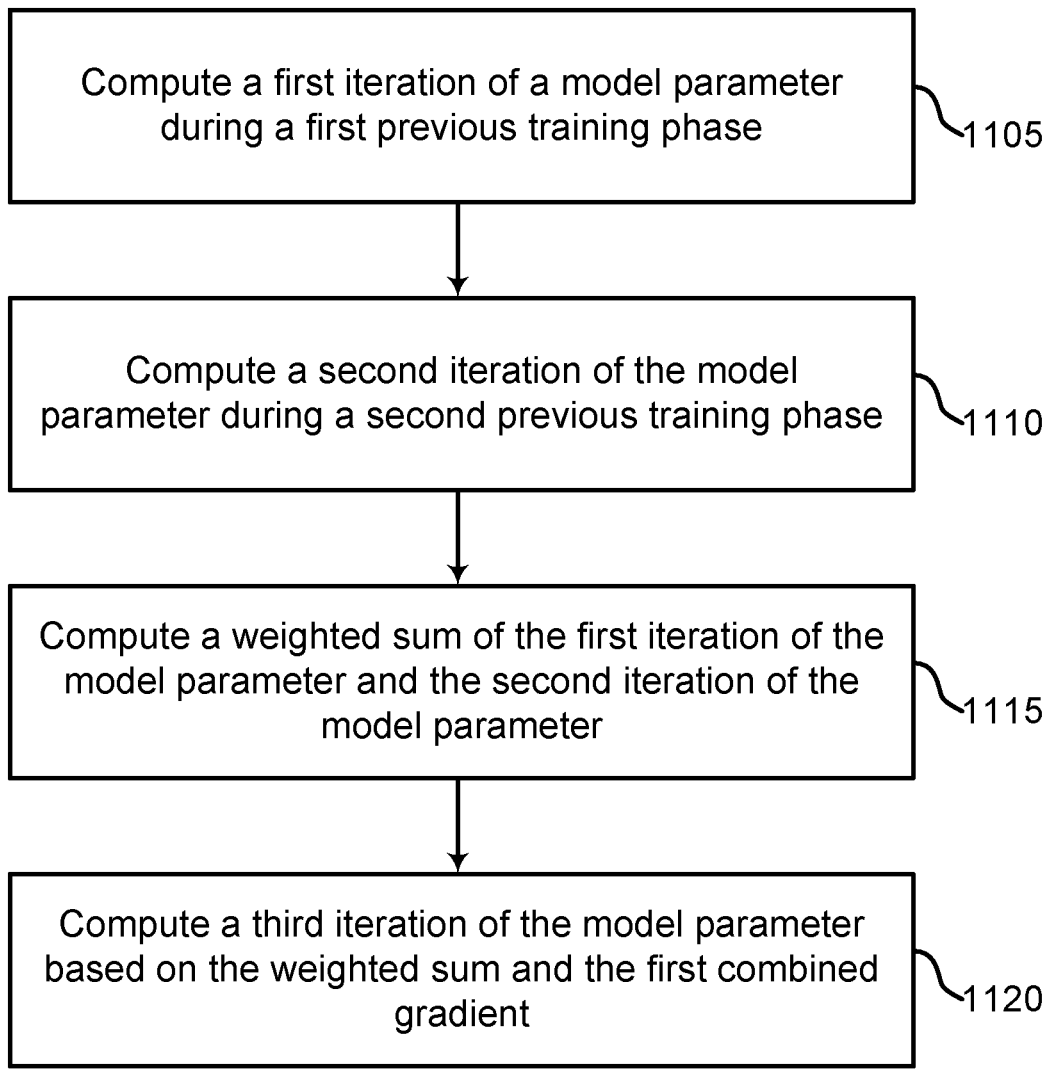
FIG. 11 shows an example of a process for computing a model parameter based on a weighted sum of previous iterations according to aspects of the present disclosure.

FIG. 11 shows an example of a process for computing a model parameter based on a weighted sum of previous iterations according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system computes a first iteration of a model parameter during a first previous training phase. In some cases, the operations of this step refer to, or may be performed by, a training component as described with reference to FIGS. 4 and 5. In some examples, the initial model parameter is $w_{t_0}$ at timestep $t_0$.

At operation 1110, the system computes a second iteration of the model parameter during a second previous training phase. In some cases, the operations of this step refer to, or may be performed by, a training component as described with reference to FIGS. 4 and 5.

At operation 1115, the system computes a weighted sum of the first iteration of the model parameter and the second iteration of the model parameter. In some cases, the operations of this step refer to, or may be performed by, a training component as described with reference to FIGS. 4 and 5. According to an embodiment, $\mathring{w}_t=(1-\alpha_t)w_t+\alpha_t w_{t-1}$. $\mathring{w}_t$ is the weighted sum of $w_t$ and $w_{t-1}$.

At operation 1120, the system computes a third iteration of the model parameter based on the weighted sum and the first combined gradient. In some cases, the operations of this step refer to, or may be performed by, a training component as described with reference to FIGS. 4 and 5. According to an embodiment, $w_{t+1}$ is set equal to $\mathcal{P}(\mathring{w}_t-\eta(g_t+\theta_t))$. Model parameter $w_{t+1}$ is computed based on the weighted sum $\mathring{w}_t$ and the first combined gradient $g_t$.

Figure 12:
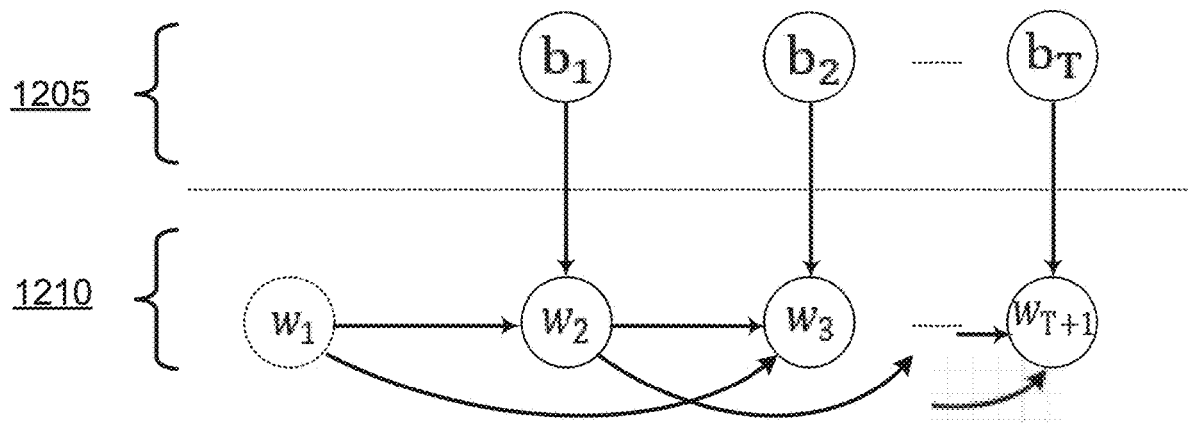
FIG. 12 shows an example of a Markov chain for updating model parameters according to aspects of the present disclosure.
Figure 12:
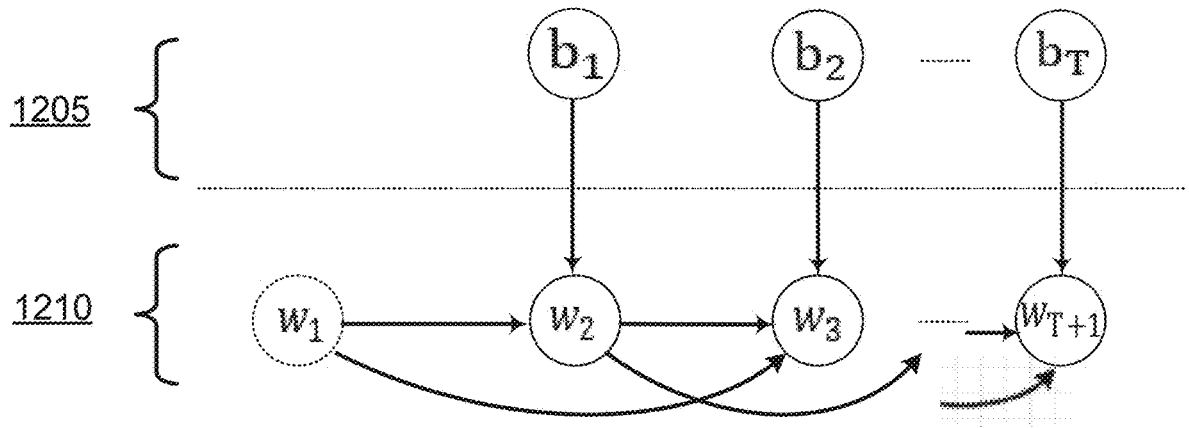

FIG. 12 shows an example of a Markov chain for updating model parameters according to aspects of the present disclosure. The example shown includes Markov chain 1200, mini-batches 1205, and iterates 1210.

One or more embodiments of the present disclosure include two algorithms (i.e., sub-sample-GD and noisy-m-A-SGD) for TV stable convex empirical risk minimization. The expected excess empirical risk of noisy-m-A-SGD is better than sub-sample-GD, in regimes of small dimension. The algorithm noisy-m-A-SGD is noisy-m-SGD algorithm used for DP convex ERM with an additional Nesterov acceleration. In noisy-m-SGD, a mini-batch $b_j$ is sampled uniformly randomly at iteration j and used to compute the gradient on the previous iterate $w_j$ denoted as $\nabla \hat{F}_S(w_j, z_{b_j})$ and updated as:

$$w_{j+1}=w_j-\eta(\nabla \hat{F}_S(w_j,z_{b_j})+\theta_t) \quad (6)$$

where $\theta_j \sim \mathcal{N}(0, \sigma^2 \mathbb{I}_d)$ and $\sigma$ is set appropriately.

The differential privacy (DP) includes a curator which possesses the dataset and an analyst or adversary against which the curator wants to ensure privacy. The analyst queries the dataset, and the curator provides DP answers to the queries. In some cases, the curator may reveal additional information pertaining to the algorithmic details, however, it is beneficial to the curator to release limited information. For example, the curator might not disclose certain states of the algorithm which may be done when the marginals of the output satisfy a strong DP-guarantee. Therefore, if the curator were to release the secret state, the adversary can correlate information and then the privacy level degrades. The privacy level is measured using the joint distribution of output and state. For example, in a noisy-m-SGD algorithm, the mini-batch indices $b_j$'s are the secret state. As a result, the released outputs $w_j$'s is shaded and $b_j$'s (i.e., hidden algorithmic state) are not shaded.

In some examples, there is no adversary in the unlearning setup or in an idealized application. The curator can be an adversary, and the dataset owners may want to minimize curator control. Therefore, the probability distribution of the entire state is maintained by the algorithm, and not just the output be exactly identical after performing the unlearning operation (i.e., similar to perfect unlearning). According to an embodiment of the present disclosure, a machine learning model maintains a minimum possible state for the unlearning algorithm. In some cases, an estimation step is used in the unlearning algorithm to increase the applicability of DP methods while decreasing the TV stability parameter and computational cost of the unlearning algorithm.

According to an embodiment, the iterates from noisy-m-SGD can be seen as generated from a Markov chain. For two neighboring datasets, the iterates are sampled from two different Markov chains P and Q. Additionally, these Markov chains are ρ-TV close, i.e., the total variation distance between joint distribution of marginals of iterates is TV $$\left(\{w_j^P\}_{j=1}^{T+1}, \{w_j^Q\}_{j=1}^{T+1}\right) \leq \rho.$$

The task is to maximally couple these two Markov Chains. In some examples, maximal coupling of Markov chains refers to the setting where one Markov chain started at two different times, and the goal is to have a coupling such that their sampled states become and remain equal as soon as possible.

Figure 13:
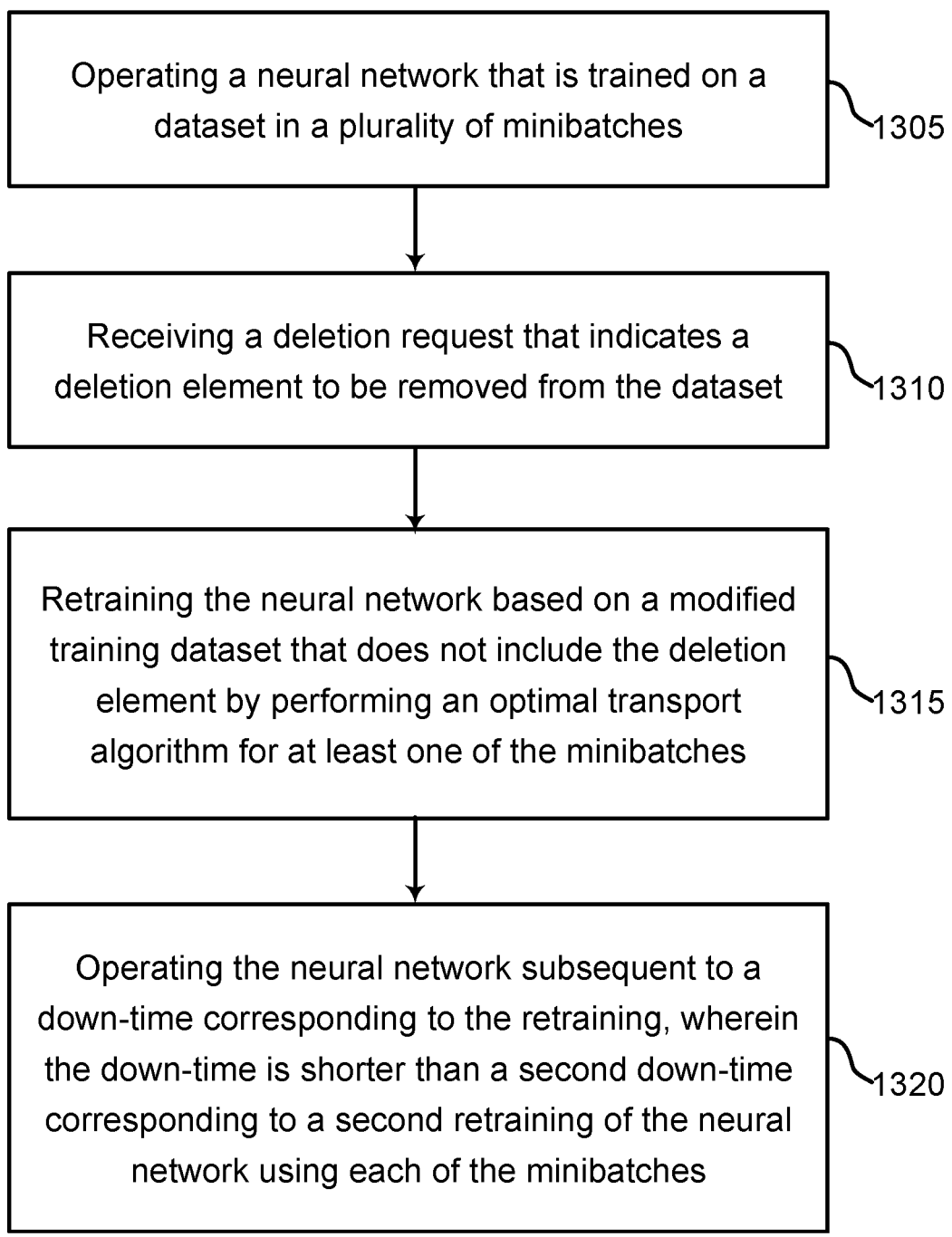
FIG. 13 shows an example of a process for operating a neural network according to aspects of the present disclosure.

FIG. 13 shows an example of a process for operating a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system operates a neural network that is trained on a dataset in a plurality of minibatches. Machine learning systems are often trained using customer data to create predictive models. However, this can lead to privacy and security issues for users.

At operation 1310, the system receives a deletion request that indicates a deletion element to be removed from the dataset. For example, the deletion request could correspond to a request from a user to delete sensitive or privacy-protected personal data. For example, personal information and sensitive data of users exist on social platforms. In some cases, users can request that their personal information be deleted and forgotten by the social platforms. Furthermore, regulatory entities have enacted laws to enforce data privacy rights and customers data ownership. In some cases, these regulations require compliance with data removal requests.

At operation 1315, the system retrains the neural network (e.g., according on an exact unlearning standard) based on a modified training dataset that does not include the deletion element by performing an optimal transport algorithm for at least one of the minibatches.

Conventional machine learning models are not able to perform exact unlearning efficiently. For example, when conventional systems remove an element from an original dataset based on a user deletion request, they must completely retrain a machine learning model based on the new dataset. Therefore, the runtime for training a new model is large.

By contrast, embodiments of the present disclosure include systems and methods that include "unlearning" algorithms configured to take a request to remove data that has been used to train a machine learning model and restore the model's state to what it would have been if the data were not used in the training. An SGD method can be used to train the neural network, and an optimal transport algorithm is used to determine whether an equivalence condition is satisfied for each training batch, and each minibatch is only retrained if the condition is not satisfied. Due to the sequential nature of SGD, if a point to be deleted participates in some iteration (i.e., a training batch), then subsequent steps that are dependent on the to-be-deleted point can be recomputed. If not, the retraining can be avoided.

In some examples, the system computes a combined gradient of the loss function by replacing the deletion element with a replacement element from the dataset. The model determines whether an original combined gradient and the modified combined gradient satisfy a stochastic condition. If the stochastic condition is satisfied, the model moves to another training batch. However, if the stochastic condition is not satisfied, the model retrains the neural network based on the remaining mini-batches.

At operation 1320, the system operates the neural network subsequent to a down-time corresponding to the retraining, wherein the down-time is shorter than a second down-time corresponding to a second retraining of the neural network using each of the minibatches. Accordingly, embodiments of the disclosure can remove personal data without completely retraining the model. As a result, an unlearning algorithm can be performed in less time less than would be required if the model was completely retrained at every user edit request. Furthermore, the accuracy of the model is not degraded. Therefore, the a machine learning model according to the present disclosure may be operated with a reduced downtime.

Learning and Unlearning Algorithms

In FIGS. 14-16, the learning and unlearning algorithms can handle a stream of edit requests (deletions, insertions, or both). The learning and unlearning algorithms satisfy the following theorems.

Theorem 1: For any $$\frac{1}{n} \le \rho < \infty,$$

there exist a learning and a corresponding unlearning algorithm such that for any $f(\cdot, z)$, which is L-smooth and G-Lipschitz convex function $\forall z$, and a stream of edit requests, satisfies exact unlearning at every time point in the stream of edit requests. Additionally, at time i in the stream, outputs $\hat{w}_{S^i}$ with excess empirical risk bounded as:

$$\mathbb{E}\hat{F}_S(\hat{w}_{S^i}) - \hat{F}_S(w_{S^i}^*) \lesssim \min\left\{\frac{GD}{\sqrt{\rho n}}, \left(\frac{L^{1/4}GD^{3/2}\sqrt{d}}{(\rho n)}\right)^{4/5}\right\} \quad (7)$$

For k edit requests, the expected total unlearning runtime is O(max {min {ρ, 1} k·Training time, k}). In some examples, training time refers to the runtime of learning algorithm. The parameter ρ controls the tradeoff between accuracy and unlearning efficiency. In some cases, unlearning efficiency is not a concern and retraining computation is performed for every edit request, then ρ>1 is set or ρ is set to a large value to obtain arbitrary small excess empirical risk. Alternatively, when the system sets ρ<1, unlearning time is reduced, and a non-trivial accuracy is increased up to $$\rho \gtrsim \frac{1}{n}.$$

The first upper bound is obtained by a standard stochastic gradient descent (SGD), which in each iteration samples a fraction of datapoints (i.e., a mini-batch) to compute the gradient called sub-sample-GD. The second upper bound is obtained using noisy accelerated mini-batch-SGD (noisy-m-A-SGD), which is used for differential private ERM. "A" means accelerated. The neural network implements unlearning algorithm for noisy-m-A-SGD based on efficient coupling of Markov chains corresponding to the learning algorithm.

Consider L, G, D=O(1), and a model of computation where a unit computation is paid for re-computation, then the unlearning task is equivalent to TV-stable algorithms, and a corresponding (maximal) coupling.

According to an embodiment of the present disclosure, upper bounds on accuracy of TV-stable algorithms for smooth convex empirical risk minimization will be described in greater detail below.

Theorem 2 (upper bound): For any 0<ρ<∞, there exists an algorithm which is min {ρ, 1}-TV stable, such that for any $f(\cdot, z)$ which is L-smooth and G-Lipschitz convex function $\forall z$, and any dataset S of n points, outputs $\hat{w}_S$ which satisfies:

$$\mathbb{E}\hat{F}_S(\hat{w}_S) - \hat{F}_S(w_S^*) \lesssim GD\min\left\{\frac{1}{\sqrt{\rho n}}, \frac{\sqrt{d}}{\rho n}\right\} \quad (8)$$

The condition $$\rho \ge \frac{1}{n}$$

is fundamental for any non-trivial accuracy, as evidenced by the lower bounds, with a matching dependence on p. Furthermore, the regime ρ≥1, is omitted in the lower bound because it is not a constraint on the algorithm.

Theorem 3 (lower bound): For any ρ-TV-stable algorithm $\mathcal{A}$, there exists a G-Lipschitz convex function $f$ and a dataset S of n points such that the expected excess empirical risk is lower bounded for any 0<ρ<1, and any dimension d, $$\mathbb{E}\hat{F}_S(\mathcal{A}(S)) - \hat{F}_S(w_S^*) \gtrsim GD\min\left\{1, \frac{1}{\rho n}\right\}.$$

Assuming that $\mathcal{A}$ (S) has a probability density function upper bounded by K≤O($2^d$) then for n>72, 0<ρ≤¼ and large d, $$\mathbb{E}\hat{F}_S(\mathcal{A}(S)) - \hat{F}_S(w_S^*) \gtrsim GD\min\left\{1, \frac{1}{\sqrt{\rho n}}\right\}.$$

In each of the lower bounds, the term GD is attained if an algorithm outputs a constant 0 (i.e., regardless of the problem instance). The first lower bound holds for all problem instances without assumptions on the relationship between the problem parameters d, n and ρ. In some cases, the upper bound is tight (see Theorem 2 above), then a lower bound of $$\frac{\sqrt{d}}{\rho n}$$

can be derived whenever $$\frac{\sqrt{d}}{\rho n} \le \frac{1}{\sqrt{\rho n}} \Leftrightarrow d \le \frac{1}{\rho n}.$$

The second result is obtained using a global analysis, such that the normalized volume of spherical cap of a hypersphere goes to 0 as d→∞, for a fixed width of the cap. The upper bound algorithm sub-sample-SGD outputs a mixture of discrete distributions.

According to an embodiment, the sequential nature of the algorithm generates samples from P for transportation to Q. The cost function is formulated as $$c(x,y) = \begin{cases} 1 & \text{if } x \ne y \\ 0 & \text{otherwise} \end{cases}$$

that otherwise that corresponds to an oracle which charges a unit computation if x and y are different from each other corresponding to a re-computation. The model uses the optimal expected computational cost which becomes equal to the total variation distance between P and Q: $\inf_{\pi \in \Pi(P,Q)} \mathbb{1}\{x \ne y\}$, i.e., maximal coupling definition of total variation distance.

The expected computation cost is larger than the total variation distance between P and Q for transport of P to Q using minimum computation cost implying at least 1−TV(P, Q) fraction of samples are representative for both P and Q. From the sequential nature of the task, during generation of P, the output on dataset S, Q is unknown, because the incoming edit request is not specified. Therefore, the output of the algorithm is kept close in total variation distance uniformly over all possible Q's (i.e., see definition of total variation stability).

According to an embodiment, a machine learning algorithm is used to generate P, Q, and the coupling between P, and Q. Additionally, the machine learning system includes a ρ-TV stable algorithm with the maximum accuracy for convex ERM.

One or more embodiments of the present disclosure include designing and implementing TV-stable learning algorithms. Differential privacy (DP) relates to data privacy defined as follows. An algorithm $\mathcal{A}$ satisfies $(\epsilon, \delta)$-differential privacy if for any two neighboring datasets S and S', differing in one sample, for any measurable event $\varepsilon \in $ Range $(\mathcal{A})$, $$\mathbb{P}(\mathcal{A}(S) \in \varepsilon) \le e^\epsilon \mathbb{P}(\mathcal{A}(S') \in \varepsilon) + \delta \quad (9)$$

A differentially private algorithm provides output distributions that are close such that the likelihood ratios for all events for two neighboring datasets is uniformly close to $e^{\pm\epsilon}$, up to a failure probability δ. In some cases, the outputs are ρ-Total Variation stable, i.e., the two distributions for neighboring datasets are identical. As a result, the $(\epsilon, \delta)$-DP notion is related to ρ-TV-stability such that in one direction any ρ-TV stable method is (at least) $(0, \rho)$-DP. Similar relations can be derived for the other direction. Therefore, DP methods can be TV stable, for example, the Gaussian mechanism. Adding Gaussian noise of variance $$\frac{\sqrt{\log(1/\delta)}}{\epsilon}$$

to a 1-sensitive function, provides $(\epsilon, \delta)$-DP and may also provide ρ-TV stability, with $$\rho = \frac{\epsilon}{\sqrt{\log(1/\delta)}}.$$

According to some embodiments of the present disclosure, each of the learning algorithms has a corresponding unlearning algorithm. The noisy-m-SGD (no acceleration) algorithm will be described in greater detail below.

FIG. 14 shows an example of a learning algorithm for training a neural network according to aspects of the present disclosure. Learning algorithm 1400 is an example of, or includes aspects of, the corresponding element described with reference to FIG. 3.

According to an embodiment, the algorithm sub-sample-GD runs basic (i.e., vanilla) mini-batch SGD wherein at each iteration, a minibatch of size m is sub-sampled uniformly randomly. Further, the mini-batch indices, gradients and iterates are saved to the memory. The corresponding unlearning algorithm (see algorithm 1500 below) uses all the saved iterates. In some examples, the unlearning algorithm may not depend on any iterate and has the same unlearning time complexity. Therefore, the machine learning model is not dependent on saving all the iterates.

In some cases, the machine learning model uses functions in the algorithm, for example, save and load, which means saving and loading the variables to and from a memory or a memory unit, respectively.

According to an embodiment, algorithm 1400 involves a function named sub-sample-GD. The function takes $w_{t_0}$, $t_0$ as input. For example, the input includes initial model $w_{t_0}$, data points $\{z_1, \ldots, z_n\}$, T, m, η. At line 1, for $t=t_0, t_0+1 \ldots$, T, algorithm 1400 is executed to run lines 2 to 5. At line 2, algorithm 1400 is executed to sample mini-batch $b_t$ of size m uniformly randomly. At line 3, $g_t$ is set equal to $$\frac{1}{m}\sum_{j \in b_t} \nabla f(w_t, z_j).$$

At line 4, $w_{t+1}$ is set equal to $\mathcal{P}(w_t - \eta g_t)$. At line 5, the Save function is executed, i.e., Save($b_t$, $w_t$, $g_t$). The output is $$\hat{w}_S = \frac{1}{T}\sum_{t=1}^{T+1} w_t.$$

One or more embodiments of the present disclosure gives guarantees on excess empirical risk for sub-sample-GD. Referring to a first proposition, let $f(\cdot, z)$ be an L-smooth G-Lipschitz convex function $\forall z$. The sub-sample GD algorithm (i.e., algorithm 1400) is run with $$t_0 = 1, \eta = \min\left\{\frac{1}{2L}, \frac{D\sqrt{\rho n}}{GT}\right\}, T = \frac{DL\sqrt{\rho n}}{G}, \text{ and } m = \max\left\{\frac{G\sqrt{\rho n}}{DL}, 1\right\},$$

outputs $\hat{w}_S$ which is min{ρ, 1}-TV-stable and satisfies $$\mathbb{E}\hat{F}_S(\hat{w}_S) - \hat{F}_S(w_S^*) \lesssim \frac{GD}{\sqrt{\rho n}}.$$

FIG. 15 shows an example of a learning algorithm with a noise parameter for training a neural network according to aspects of the present disclosure. The example includes learning algorithm 1500.

According to an embodiment, the learning algorithm 1500 (i.e., noisy-m-A-SGD) is mini-batch accelerated SGD with Gaussian noise added at each iteration. Learning algorithm 1500 (with or without acceleration) is used for DP training of (non) convex models. In each iteration, the mini-batch indices, the models, the gradients and the noise vectors are saved to the memory.

Learning algorithm 1500 involves a function named noisy-m-A-SGD. The function takes $w_{t_0}$, $t_0$ as input. For example, the input includes initial model $w_{t_0}$, data points $\{z_1, \ldots, z_n\}$, T, q, m. At line 1, $w_0$ is set to 0. At line 2, algorithm 1500 is executed to run a for loop. For $t=t_0, t_0+1 \ldots, T$, algorithm 1500 is executed to run lines 3 to 8. At line 3, algorithm 1500 is executed to sample mini-batch $b_t$ of size m uniformly randomly. Algorithm 1500 samples $\theta_t$ which has a normal distribution $\mathcal{N}(0, \sigma^2 \mathbb{I}_d)$. The mean is 0 and the variance is $\sigma^2 \mathbb{I}_d$. At line 5, $\mathring{w}_t = (1-\alpha_t)w_t + \alpha_t w_{t-1}$. At line 6, $g_t$ is set equal to $$\frac{1}{m}\sum_{j \in b_t} \nabla f(\mathring{w}_t, z_j).$$

At line 7, $w_{t+1}$ is set equal to $\mathcal{P}(\mathring{w}_t - \eta(g_t + \theta_t))$. At line 8, Save function is executed, i.e., $\text{Save}(b_t, \theta_t, w_t, \mathring{w}_t, g_t)$. The output is $\hat{w}_S = w_{T+1}$.

Referring to a second proposition, let $f(., z)$ be an L-smooth G-Lipschitz convex function $\forall z$. For any $0 < \rho < \infty$, the noisy-m-A-SGD algorithm (i.e., learning algorithm 1500) runs with $$t_0 = 1, \eta = \min\left\{\frac{1}{2L}, \frac{D}{\left(\frac{G}{\sqrt{m}} + \sigma\right)T^{3/2}}\right\},$$

$$\alpha_t = \frac{1-t}{t+2}, \sigma = \frac{8\sqrt{T}G}{n\rho}, \text{ and } T \geq \frac{(n\rho)^2}{16m^2}$$

outputs $\hat{w}_S$ which is $\min\{\rho, 1\}$-TV stable and satisfies:

$$\mathbb{E}\hat{F}_S(\hat{w}_S) - \hat{F}_S(w_S^*) \lesssim \frac{LD^2}{T^2} + \frac{GD}{\sqrt{Tm}} + \frac{GD\sqrt{d}}{n\rho} \quad (10)$$

Referring to a first corollary, let $f(., z)$ be an L-smooth G-Lipschitz convex function $\forall z$. For any $0 < \rho < \infty$, the noisy-m-A-SGD algorithm (i.e., learning algorithm 1500) runs with $$m \geq \min\left\{\frac{d}{16}, \frac{1}{4}\left(\frac{(\rho n)^3 G\sqrt{d}}{LD}\right)^{1/4}\right\}, \eta = \min\left\{\frac{1}{2L}, \frac{D}{\left(\frac{G}{\sqrt{m}} + \sigma\right)T^{3/2}}\right\},$$

$$\alpha_t = \frac{1-t}{t+2}, \sigma = \frac{8\sqrt{T}G}{n\rho}, \text{ and } T = \max\left\{\frac{(\rho n)^2}{md}, \sqrt{\frac{LD\rho n}{G\sqrt{d}}}\right\}$$

outputs $\hat{w}_S$ which is $\min\{\rho, 1\}$-TV stable and satisfies $$\mathbb{E}\hat{F}_S(\hat{w}_S) - \hat{F}_S(w_S^*) \lesssim \frac{GD\sqrt{d}}{n\rho}.$$

The choice of T in the first corollary yields that the largest mini-batch size that can be set without affecting the runtime, is $$m = \left(\frac{(\rho n)^3 G}{\sqrt{d}^3 LD}\right)^{1/2} = \left(\frac{G}{LD}\right)^2 T^3.$$

Furthermore, the condition $$m \geq \min\left\{\frac{d}{16}, \frac{1}{4}\left(\frac{(\rho n)^3 G\sqrt{d}}{LD}\right)^{1/4}\right\} \text{ yields } (\rho n) \geq \left(\frac{LD(\sqrt{d})^7}{256G}\right)^{1/3}.$$

Referring to a third proposition, there exists neighboring datasets S and S' of n points, and smooth G-Lipshcitz convex functions $f$ and constraint set W such that the total variation distance between iterates produced by the noisy-m-A-SGD algorithm (learning algorithm 1500) run on datasets S and S', denoted by $\{w_1, w_2, \ldots, w_T\}$ and $\{w'_1, w'_2, \ldots, w'_T\}$ respectively, is bounded as:

$$TV((w_1, w_2, \ldots, w_T), (w'_1, w'_2, \ldots, w'_T)) \geq \min\left\{\Omega\left(\frac{G\sqrt{T}}{n\sigma}\right), 1\right\} \quad (11)$$

FIG. 16 shows an example of an unlearning algorithm 1600 for re-training a neural network according to aspects of the present disclosure. Unlearning algorithm 1600 is an example of, or includes aspects of, the corresponding element described with reference to FIG. 3.

In some embodiments of the present disclosure, the machine learning model applies algorithms to handle edit requests which are based on efficiently constructing couplings, (e.g., maximal couplings). A verification step is used in constructing maximal couplings. The machine learning model (or the unlearning algorithm 1600) checks if the current model is likely after the edit request or not. If the verification succeeds, the machine learning model does not incur any additional computation. Otherwise, a partial or full re-computation (i.e., retraining) is performed. Unlearning algorithm 1600 corresponds to learning algorithm 1400 (see FIG. 14).

At the start of the stream, at every iteration of sub-sample-SGD, a machine learning model samples a mini-batch of size m out of n points uniformly randomly, and then computes a gradient using these samples. As the learning algorithm progresses along the stream observing edit requests, the number of available data points changes. For example, if the algorithm is executed on a dataset of $\bar{n}$ points, m out of $\bar{n}$ (i.e., not n) points are sub-sampled at every iteration. The way to account for this discrepancy is to verify if the output (model) were likely (with respect to the algorithm's randomness) had it been executed on this new dataset.

According to an embodiment, unlearning algorithm 1600 is used to couple the subsample indices (e.g., coupling mini-batch indices). Scenarios include deletion request and insertion request. For deletion, the machine learning model evaluates each mini-batch, and verifies if the deleted point was used or not. If the deletion point was not used in any iterations, then the machine learning model does not do anything. Otherwise, the model triggers a re-compute. For insertion, there is no way of selecting iterations in which the point was sampled, because the inserted point was absent. The new point would have been sampled with probability m/(n+1). As a result, the machine learning model verifies by selecting each iteration with the same probability. Then, the machine learning model replaces a uniformly sampled point in the mini-batch of that step by the inserted point.

Unlearning algorithm 1600 is an unlearning algorithm for sub-sample-SGD. The function takes as input data point index j to delete or data point z to insert (i.e., index n+1). At line 1, for t=1, 2, . . . , T, unlearning algorithm 1600 is executed to run lines 2 to 11. At line 2, unlearning algorithm 1600 loads the variables $b_t, g_t$ and $w_t$. At line 3, algorithm 1600 checks if there is a deletion request and if $j \in b_t$, i.e., if j is an element of $b_t$, then lines 4 to 5 are executed. Otherwise, if there is an insertion request and the probability of a Bernoulli distribution is $$\frac{m}{n+1}$$

(i.e., line 6), lines 7 to 12 are executed. At line 4, algorithm 1600 calls upon the function sub-sample-GD used in learning algorithm 1400 and uses $w_t$ and t as inputs. Algorithm 1600 continues training on the current dataset followed by loop termination (i.e., line 5). At line 7, algorithm 1600 samples i by executing a function Uniform which uniformly samples from a mini-batch $b_t$. At line 8, $g'_t$ is set equal to $$g_t - \frac{1}{m}(\nabla f(w_t, z_i) - \nabla f(w_t, z)).$$

At line 9, $w_{t+1}$ is set equal to $\mathcal{P}(w_t - \eta(g'_t + \theta_t))$. At line 10, the Save function is executed. Algorithm 1600 saves $w_{t+1}, g'_t$, and $b_t$ (which excludes element i, then adds {n+1}), i.e., Save $(w_{t+1}, g'_t, b_t \setminus \{i\} \cup \{n+1\})$. At line 11, algorithm 1600 calls upon the function sub-sample-GD as in algorithm 1400 where $w_{t+1}$ and t+1 are inputs. Algorithm 1600 continues training on the current dataset followed by loop termination (i.e., line 12).

Referring to the fourth proposition, sub-sample-GD learning and unlearning, (i.e., learning algorithm 1400, unlearning algorithm 1600) satisfy exact unlearning. Additionally, for k edits, sub-sample-GD unlearning (i.e., unlearning algorithm 1600) re-computes with probability at most 2kρ.

FIG. 17 shows an example of an unlearning algorithm with a noise parameter for re-training a neural network according to aspects of the present disclosure. Unlearning algorithm 1700 corresponds to aspects of learning algorithm 1600 of FIG. 16.

According to some embodiments of the present disclosure, an unlearning algorithm 1700 for noisy-m-A-SGD is based on efficiently constructing a coupling of Markov chain describing noisy-m-A-SGD, with large mass on its diagonal.

In an embodiment, unlearning algorithm 1700 for noisy-m-A-SGD couples mini-batch indices while handling edit request. Scenarios include deletion request and insertion request. After observing a deletion request, unlearning algorithm 1700 is executed to evaluate all the iterations in which the deleted point was sampled. Next, the deleted point is replaced with a uniformly random point not already sampled in that iteration. For insertion, at each step, the machine learning model (i.e., via unlearning algorithm 1700) again replaces a uniformly sampled point in the mini-batch of that step by the inserted point with probability m/n+1.

Unlearning algorithm 1700 is an unlearning algorithm for noisy-m-A-SGD. The input of the function includes data point index j to delete or the data point z to insert (i.e., index n+1). At line 1, for t=1, 2, . . . , T, unlearning algorithm 1700 is executed to run lines 2 to 19. At line 2, unlearning algorithm 1700 loads the variables $\theta_t, w_t, \mathring{w}_t, b_t$ and $g_t$. At line 3, unlearning algorithm 1700 checks if there is a deletion request and if $j \in b_t$, i.e., if j is an element of $b_t$, then lines 4 to 6 are executed. Otherwise, if there is an insertion request and the probability of a Bernoulli distribution is $$\frac{m}{n+1}$$

(i.e., line 7), lines 8 to 10 are executed. In other conditions (i.e., when lines 3 and 7 do not hold true), algorithm 1700 executes the next iteration of the for loop (i.e., lines 11 to 13). At line 4, algorithm 1700 samples i by executing a function Uniform which uniformly samples from n points of dataset S that have not been sampled in that iteration (i.e., not belonging to mini-batch $b_t$). At line 5, $g'_t$ is set equal to $$g_t - \frac{1}{m}\left(\nabla f(\mathring{w}_t, z_j) - \nabla f(\mathring{w}_t, z_i)\right).$$

At line 6, the Save function is executed. Algorithm 1700 saves $g'_t$ and $b_t$ (which excludes element {j}, then performs union with {i}), i.e., Save $(g'_t, b_t \setminus \{j\} \cup \{i\})$. At line 8, algorithm 1700 samples i by executing a function Uniform which uniformly samples from a mini-batch $b_t$. At line 9, $g'_t$ is set equal to $$g_t - \frac{1}{m}\left(\nabla f(\mathring{w}_t, z_j) - \nabla f(\mathring{w}_t, z)\right).$$

At line 10, the Save function is executed. Algorithm 1700 saves $g'_t$ and $b_t$ (which excludes element i, then performs union with {n+1}), i.e., Save $(g'_t, b_t \setminus \{i\} \cup \{n+1\})$. At line 14, $\xi_t$ is set equal to $g_t + \theta_t$. At line 15, algorithm 1700 draws a uniform random variable by rejection sampling at every iteration using a function Unif(0, 1). If the function Unif(0, 1) is larger than or equal to $$\frac{\phi_{N(g'_t, \sigma^2 \mathbb{I})}(\xi_t)}{\phi_{N(g_t, \sigma^2 \mathbb{I})}(\xi_t)},$$

lines 16 to 21 are executed. At line 16, algorithm 1700 calls upon the function reflect($\xi_t, g'_t, g_t$) which finds the reflection of $\xi_t$ under $(g'_t, g_t)$. Algorithm 1700 creates a new variable $\xi'_t$ and sets $\xi'_t$ equal to the value of the reflect function. At line 17, $w_{t+1}$ is set equal to $w_t - \eta \xi'_t$. At line 18, the Save function is executed, i.e., Save $(\xi'_t)$. At line 19, algorithm 1700 calls upon the function noisy-m-A-SGD from algorithm 1500 and uses $w_{t+1}$ and t+1 as inputs. Algorithm 1700 continues retraining on the current dataset S' followed by loop terminations (i.e., lines 20 to 22). In some cases, learning algorithms 1400 and 1500 are referred to as algorithms 1400 and 1500 interchangeably. Unlearning algorithms 1600 and 1700 are referred to as algorithms 1600 and 1700 interchangeably.

Evaluation and Runtime

Performance of apparatus, systems and methods of the present disclosure have been evaluated, and results indicate embodiments of the present disclosure have obtained increased performance over existing technology. Example experiments demonstrate that the machine learning system outperforms conventional systems.

According to an embodiment, the unlearning method generates a coupling but not a maximal coupling, the measure of the diagonal under the coupling, and hence the probability to recompute is $\sqrt{T}$ worse than the optimal, where T is the number of iterations run of noisy-m-SGD. As a result, the faster the algorithm is, the smaller the probability to recompute, when using the coupling construction. One or more embodiments of the present disclosure use accelerated mini-batch SGD due to a quadratically faster runtime than basic mini-batch SGD. Maximal coupling (i.e., measure of the diagonal under the coupling and the probability to recompute) may be done using one step rejection sampling, instead of doing it iteratively, which results in smaller probability to recompute and a faster algorithm.

According to some embodiments of the present disclosure, the machine learning model creates maximal couplings between marginals of the outputs, and therefore measures TV between marginals of the output (i.e., not the entire algorithmic state). Consider $j^{th}$ iteration of noisy-m-SGD, then $b_j$ is additional state, and the machine learning model measures TV between marginals of $w_j$ and $w'_j$. The distribution of $w_j$ is such that, for any event E in range of $w_j$, $P(w_j \in E) = \mathbb{E}_b P(w_j \in E | b_j = b)$. The machine learning model measures the ratio of marginal densities:

$$\frac{\phi_Q(w_j)}{\phi_P(w_j)}$$

to construct a coupling between the marginals using rejection sampling. However, the marginals are mixture distributions with large (exponential in m (mini-batch size)) number of components, and evaluating the marginal density is not feasible. In some embodiments, the machine learning model evaluates the ratio of conditional probabilities, where the conditioning is on the coupled mini-batch indices ($b_j^P$ and $b_j^Q$), i.e., $$\frac{\phi_Q(w_j | b_j^Q)}{\phi_P(w_j | b_j^P)}$$

which corresponds to using unbiased estimates of the marginals densities. The unbiased estimates are verified using convexity of the pointwise supremum, for example, that $TV((w_j^P, b_j^P),(w_j^Q, b_j^Q)) \geq \mathbb{E}_{(b_j^P, b_j^Q)} TV(w_j^P | b_j^P, w_j^Q | b_j^Q) \geq TV(w_j^P, w_j^Q)$.

In this section, learning and unlearning runtime of the algorithms, as well as their space complexity are evaluated and described in detail. For example, the sub-sample-GD learning (learning algorithm 1400) depends on $mT = \rho n$ stochastic gradient computations. For learning algorithm 1400, if $$m \leq \sqrt{\frac{LD\rho n}{G\sqrt{d}}},$$

the noisy-m-A-SGD learning algorithm depends on $$mT = m\left(\frac{\rho n}{md}\right) = \frac{(\rho n)^2}{d}$$

stochastic gradient computations. Setting a larger m may increase the total runtime. The total stochastic gradient descent computations of noisy-m-SGD (i.e., without acceleration) is $$\frac{(\rho n)^2}{d}.$$

Acceleration allows setting larger mini-batch sizes. For example, $T^3$ may be used rather than T, which leads to smaller number of iterations $$\left(\text{i.e., } \sqrt{\frac{\rho n}{\sqrt{d}}} \text{ as opposed to } \frac{\rho n}{\sqrt{d}}\right)$$

and hence a smaller probability of recompute.

Using accelerated mini-batch SGD in place of mini-batch SGD in sub-sample-GD learning algorithm (learning algorithm 1400) results in a decreased runtime. For noisy-m-A-SGD learning algorithm (learning algorithm 1400), faster algorithms lead to better unlearning runtimes. For example, setting largest allowed $$m = \sqrt{n}, Tm = O\left(\frac{\sqrt{n}}{\sqrt{\epsilon}}\right)$$

is obtained.

$$\epsilon = \frac{\sqrt{d}}{\rho n},$$

which yields $$Tm = O\left(\sqrt{n}\sqrt{\frac{\rho n}{\sqrt{d}}}\right)$$

stochastic gradient computations. Note that this is smaller than that of noisy-m-A-SGD (unless $\rho$ is very small), however $$T = \sqrt{\frac{\rho n}{\sqrt{d}}}$$

same as that of noisy-m-A-SGD, showing no improvement in unlearning time.

One or more embodiments of the present disclosure include the compute used by sub-sample-GD and noisy-m-A-SGD unlearning algorithms to handle edit requests. In one embodiment, a coupling with acceptance probability at least 1−ρ is constructed with the unlearning algorithm which holds for any TV-stable algorithm. In-expectation bounds are provided on the number of times verification fails or a full or partial recompute is triggered.

In some cases, for a coupling based unlearning algorithm with acceptance probability at least 1−ρ, for k edit requests, the expected number of times recompute is triggered is at most 4kρ.

Runtimes have been calculated for sub-sample-GD and noisy-m-A-SGD unlearning algorithms (unlearning algorithms 1500 and 1600) to handle one deletion or insertion request. The system determines whether or not recompute is to be triggered or not based on the runtime of verification. In some examples, this can be done efficiently in the standard algorithmic model of computation (word RAM model). For example, as standard in convex optimization, Nemirovski-Yudin's model of computation is used which counts the number of accesses to the first-order (gradient) information of the function, and a projection oracle. Let $\mathfrak{G}$ denote the compute cost for one gradient access or projection in the standard model of computation when both oracles need the same compute. Additionally, runtime is formulated as a function of the problem parameters ignoring constants. Furthermore, as the number of samples at any point in the stream is between $$\frac{n}{2} \text{ and } 2n,$$

n samples are used, and everything (including constants) is the same.

In sub-sample-GD unlearning (unlearning algorithm 1500), for deletion, a machine learning model checks if the used mini-batch $b_t$ contained the requested point for every iteration. A brute force search takes O(m) time, whereas if the mini-batch indices be are sorted when saving, a binary search can be done in O(log (m)) time. Alternatively, a constant time search may be achieved by storing a dictionary or hash table, giving an O(T) total time. In some cases, one method is to store a dictionary of sample to mini-batch iterations that the sample was used in. The dictionary of sample takes O(1) time to lookup for every edit request. For insertion, the model samples from a Bernoulli with bias m/n at every iteration which takes constant time, giving O(T) total time. Alternatively, one method is to sample one Bernoulli with bias Tm/n and recompute based on its outcome which gives O(1) time lookup for every edit request.

Similarly, in noisy-m-A-SGD unlearning algorithm (unlearning algorithm 1600), a search is performed in constant time to check whether the deleted point was used in any iteration or not. For every iteration in which the deleted point is in the mini-batch, the model computes a gradient at a new point to replace the deleted point. Sampling a point uniformly from a discrete universe takes linear time (in the size), and can be done in logarithmic or constant time with pre-processing. For example, when saving the mini-batch indices $b_t$, if the model saves a sorted list of the unsampled indices, a binary search can provide sampling in O(log(n−(m−1))) time. Alternatively, if the model saves a probability table, then the Alias method can be used to sample in O(1) time. Hence, two gradients are queried for such iterations, and it takes O(d) compute (i.e., to add or subtract) the gradients. Since the total number of iterations in which a deleted point was sampled in is $$\frac{Tm}{n},$$

the expected total compute is $$\frac{Tm(\mathfrak{G}+d)}{n}.$$

The computational cost of rejection sampling is described in detail below.

The noisy-m-A-SGD unlearning algorithm (unlearning algorithm 1600), the machine learning model checks if $$Unif(0,1) \le \frac{\phi_{N(g'_t,\sigma^2 \mathbb{I})}(\xi_t)}{\phi_{N(g_t,\sigma^2 \mathbb{I})}(\xi_t)}$$

at every iteration, where $\phi_{\mathcal{N}(g_t,\sigma^2 \mathbb{I})}(\cdot)$ and $\phi_{\mathcal{N}(g'_t,\sigma^2 \mathbb{I})}(\cdot)$ are probability densities evaluated at the sampled point $\xi_t$. The ratio of probability densities (i.e., Gaussian densities) is formulated as follows:

$$\frac{\phi_{N(g'_t,\sigma^2 \mathbb{I})}(\xi_t)}{\phi_{N(g_t,\sigma^2 \mathbb{I})}(\xi_t)} = \frac{\frac{1}{(\sqrt{2\pi\sigma^2})^d}\exp\left(-\frac{\|g'_t-\xi_t\|^2}{2\sigma^2}\right)}{\frac{1}{(\sqrt{2\pi\sigma^2})^d}\exp\left(-\frac{\|g_t-\xi_t\|^2}{2\sigma^2}\right)} = \exp\left(\frac{1}{2\sigma^2}(\|g_t-\xi_t\|^2-\|g'_t-\xi_t\|^2)\right) \quad (12)$$

The computation of the ratio of probability densities takes O(d) time. Additionally, the ratio in iterations is computed where the means differ (i.e., correspond to the iterations where the deleted point was sampled, or the inserted point would have been sampled). The expected number of such iterations is $$\frac{Tm}{n}$$

which gives a computational cost of $$\frac{Tmd}{n}$$

for rejection sampling, and therefore the expected runtime of verification is $$\frac{Tm(\mathfrak{G}+d)}{n}.$$

Bounds on runtime for both unlearning algorithms are described in detail below. The expected total runtime of sub-sample-GD unlearning algorithm (unlearning algorithm 1500) for k edit requests is O (max {k, min {ρ, 1} k·Training time}) and the expected total runtime of noisy-m-A-SGD unlearning algorithm (unlearning algorithm 1600) for k edit requests is O (max {k, min {ρ√T, 1}·k·Training time}).

Next, the space complexities of the learning and unlearning algorithms are evaluated and described in greater detail below. In both algorithms, the machine learning model saves a hash-table of iterations to samples—since the model does T iterations with m samples each, this takes space of O(Tm) words. The iterates, which are d-dimensional vectors, are stored in a space of O(dT) words. Additionally, the model stores a dictionary of iterations to models, which takes O(T) space. Therefore, the space complexity is O(T(max {m, d}).

For learning algorithm 1400, plugging $$T \le \frac{\rho n}{m},$$

it is calculated that $$\text{space complexity} = O\left(\rho n \max\left\{1, \frac{d}{m}\right\}\right).$$

The space complexity can be increased by not saving the iterates and maintaining the same unlearning runtime. In some cases, the re-computation time is upper bounded by a full re-computation time, i.e., the upper bound on unlearning runtime holds even if the algorithm does full retraining every time verification fails. As a result, full retraining, with fresh randomness for the mini-batches, is performed for deletion in sub-sample-GD unlearning algorithm (unlearning algorithm 1500). For insertion in sub-sample-GD unlearning algorithm, if condition is met (line 6 in unlearning algorithm 1500), the iterate $w_t$ is used to compute the gradient on the inserted point (line 8 in unlearning algorithm 1500). Alternatively, $w_t$ (if not saved) may be computed on the fly by doing a full retraining with the same old mini-batches. The remaining steps of sub-sample-GD unlearning algorithm (unlearning algorithm 1500) are executed after $w_t$ is computed. As a result, a hash-table of samples is saved to binary values which correspond to whether they were used or not, which takes O(n) words, and a d dimensional model. Hence, the space complexity of unlearning algorithm 1500 is O(n+d) words.

For learning algorithm 1400 and based on the second proposition, if $$m \le O(T^3),$$
$$T = \frac{\rho n}{md},$$

and therefore, $$dT = \frac{\rho n}{m}.$$

If the largest mini-batch size m=O(T³) is used, then $$T = \sqrt{\frac{\rho n}{\sqrt{d}}},$$

and hence $dT = d^{3/4}\sqrt{\rho n}$. Therefore, the space complexity is $$O(T \max\{m, d\}) \le O\left(\max\left\{\frac{(\rho n)^2}{d}, d^{3/4}\sqrt{\rho n}\right\}\right)$$

words.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of training a neural network, comprising:
   training a neural network based on a first combined gradient of a loss function at a plurality of sampled elements of a dataset;
   receiving an insertion request that indicates an insertion element to be added to the dataset, or a deletion request that indicates a deletion element to be removed from the dataset, wherein the deletion element is one of the plurality of sampled elements;
   computing a second combined gradient of the loss function by adding the insertion element to the dataset or by replacing the deletion element with a replacement element from the dataset;
   determining whether the first combined gradient and the second combined gradient satisfy a stochastic condition; and
   retraining the neural network to obtain a modified neural network based on the determination.

2. The method of claim 1, further comprising:
   computing the first combined gradient by taking an average of partial gradients for the plurality of sampled elements.

3. The method of claim 1, further comprising:
   adding a noise parameter to the first combined gradient, wherein the neural network is trained based on the first combined gradient with the added noise parameter.

4. The method of claim 1, further comprising:
   performing an optimal transport process on the first combined gradient to obtain the second combined gradient.

5. The method of claim 1, further comprising:
   computing a first partial gradient based on the deletion element, wherein the first combined gradient is based on the first partial gradient;

sampling an additional element from the dataset;
computing a second partial gradient based on the additional element; and
computing the second combined gradient based on the first partial gradient, the second partial gradient, and the first combined gradient.

6. The method of claim 1, further comprising:
performing rejection sampling on the sampled elements, wherein the neural network is retrained based on the rejection sampling.

7. The method of claim 1, further comprising:
computing a first probability density based on the first combined gradient and a noise parameter;
computing a second probability density based on the second combined gradient and the noise parameter; and
computing a ratio based on the first probability density and the second probability density, wherein the stochastic condition is based on the ratio.

8. The method of claim 7, further comprising:
selecting the replacement element from a current batch of the dataset;
determining that the ratio satisfies the stochastic condition based on the replacement element;
accepting the replacement element as a sample of the current batch based on satisfying the stochastic condition; and
evaluating a subsequent batch of the dataset, wherein the subsequent batch is evaluated without retraining the neural network based on the current batch.

9. The method of claim 7, further comprising:
determining that the ratio fails to satisfy the stochastic condition;
computing a reflected gradient based on the determination; and
retraining the neural network based on the reflected gradient.

10. The method of claim 1, wherein training the neural network further comprises:
computing a first iteration of a model parameter during a first previous training phase;
computing a second iteration of the model parameter during a second previous training phase;
computing a weighted sum of the first iteration of the model parameter and the second iteration of the model parameter; and
computing a third iteration of the model parameter based on the weighted sum and the first combined gradient.

11. The method of claim 1, further comprising:
receiving the insertion request; and
retraining the neural network based on the insertion request.

12. The method of claim 1, further comprising:
dividing the dataset to a plurality of batches, wherein the training is performed in a plurality of training phases corresponding to the plurality of batches.

13. The method of claim 1, further comprising:
receiving a plurality of additional deletion requests, wherein each of the additional deletion requests indicates an additional deletion element of the dataset to be removed; and
retraining the modified neural network based on each of the additional deletion requests.

14. The method of claim 1, further comprising:
a total variation distance between an output distribution of the neural network before retraining and a modified output distribution of the modified neural network is less than or equal to a predetermined threshold value.

15. A method comprising:
operating a neural network that is trained on a dataset including a plurality of minibatches;
receiving a deletion request that indicates a deletion element to be removed from the dataset;
retraining the neural network based on a modified training dataset that does not include the deletion element by performing an optimal transport algorithm for at least one of the minibatches; and
operating the neural network subsequent to a down-time corresponding to the retraining, wherein the down-time is shorter than a second down-time corresponding to a second retraining of the neural network using each of the minibatches.

16. The method of claim 15, further comprising:
determining whether a combined loss function gradient corresponding to an initial minibatch of the modified training dataset satisfies a stochastic condition; and
determining whether to retrain the neural network using the initial minibatch based on the determination.

17. An apparatus for training a neural network, comprising:
a processor and a memory storing instructions and in electronic communication with the processor, the processor being configured to execute the instructions to:
train a neural network based on a first combined gradient of a loss function at a plurality of sampled elements of a dataset;
receive an insertion request that indicates an insertion element to be added to the dataset, or a deletion request that indicates a deletion element to be removed from the dataset, wherein the deletion element is one of the plurality of sampled elements;
compute a second combined gradient of the loss function by adding the insertion element to the dataset or by replacing the deletion element with a replacement element from the dataset;
determine whether the first combined gradient and the second combined gradient satisfy a stochastic condition; and
retrain the neural network to obtain a modified neural network based on the determination.

18. The apparatus of claim 17, further comprising:
a rejection sampling component configured to perform rejection sampling on the sampled elements, wherein the neural network is retrained based on the rejection sampling.

19. The apparatus of claim 17, the instructions further configured to:
perform an optimal transport process on the first combined gradient to obtain the second combined gradient.

* * * * *